United States Patent [19]

Chen

[11] Patent Number: 5,012,193

[45] Date of Patent: Apr. 30, 1991

[54] METHOD AND APPARATUS FOR FILTERING DATA SIGNALS PRODUCED BY EXPLORATION OF EARTH FORMATIONS

[75] Inventor: Min-Yi Chen, West Redding, Conn.

[73] Assignee: Schlumberger Technology Corp., New York, N.Y.

[21] Appl. No.: 430,207

[22] Filed: Nov. 1, 1989

[51] Int. Cl.[5] .............................................. G01V 3/20
[52] U.S. Cl. .................................. 324/366; 324/374; 364/422
[58] Field of Search ............... 324/374, 366, 355, 367, 324/351; 364/422; 340/853, 860; 73/151, 152; 250/253, 256, 262, 264, 268

[56] References Cited

U.S. PATENT DOCUMENTS

| | | | |
|---|---|---|---|
| 4,468,623 | 8/1984 | Gianzero et al. | 324/374 X |
| 4,567,759 | 2/1986 | Ekstrom | 324/355 X |
| 4,692,908 | 9/1987 | Ekstrom | 324/367 X |
| 4,851,781 | 7/1989 | Marzetta et al. | 324/366 X |
| 4,862,090 | 8/1989 | Vannier et al. | 324/367 |

*Primary Examiner*—Kenneth Wieder
*Assistant Examiner*—Warren S. Edmonds
*Attorney, Agent, or Firm*—Peter Y. Lee; Albert L. Free

[57] ABSTRACT

A filter removes certain noise-induced artifacts from a two-dimensional image of a bore-hole wall, this image being formed by signals from a two-dimensional array of staggered electrodes pulled along the bore-hole wall. The noise artifacts are due to a type of noise which varies as a function of depth of the array, but which is substantially the same at all electrodes at any given time. The artifacts appear in the image in the form of a "footprint" of the electrode array, as an unintended result of a depth-adjustment process in which the original frames of samples of the signals at the electrodes of the staggered array, all taken essentially at the same time, are later resampled to produce frames of samples each corresponding to the same depth in said bore-hole. The filter makes use of the fact that the configuration of the artifact in the image is known, and that the true signal values do not change much between azimuthally adjacent electrodes. The preferred form of the filter produces, and substracts from each sample, a value of noise n which is a function of the depth of each electrode and which is such as to minimize the minimal discontinuity measure.

16 Claims, 11 Drawing Sheets

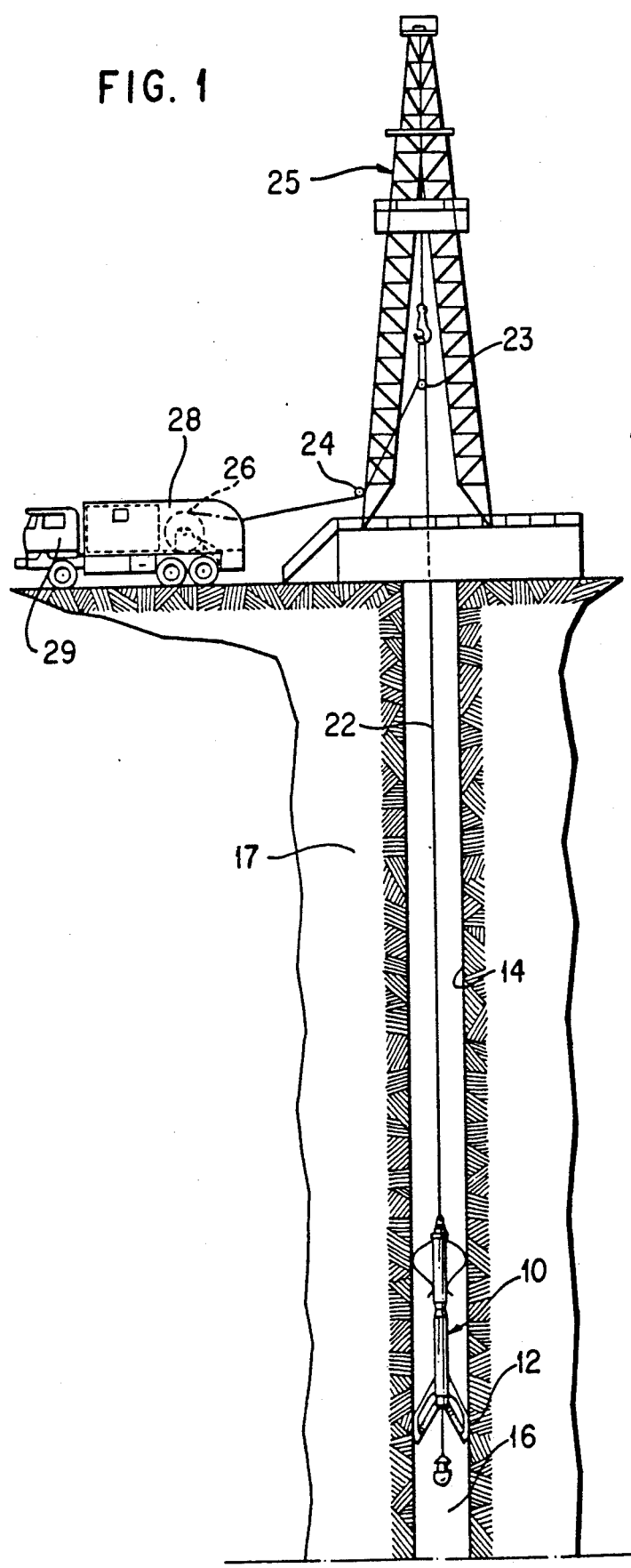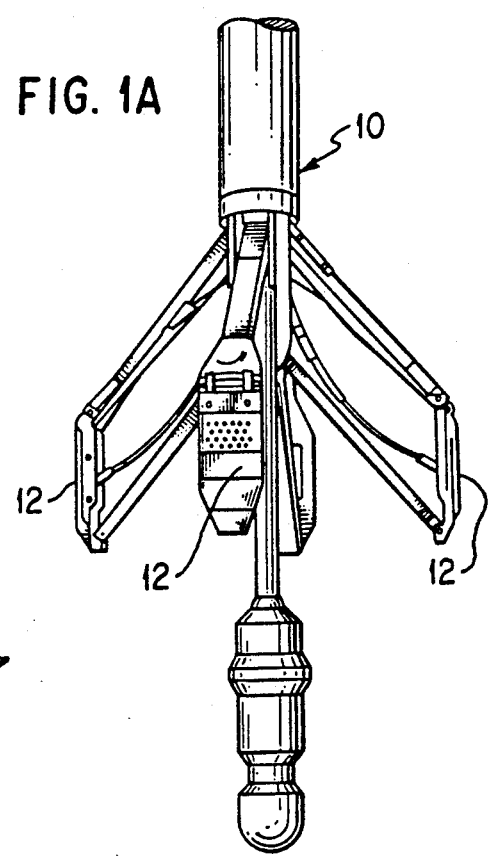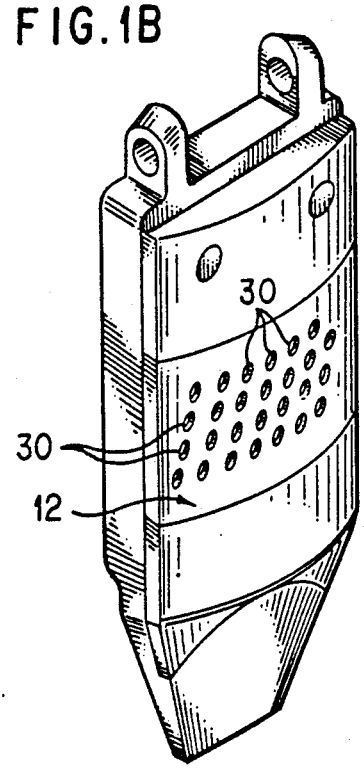
FIG. 1
FIG. 1A
FIG. 1B

FIG. 4

SAMPLE VALUES BEFORE DEPTH ADJUSTMENT

| SAMPLE TIME | ELECTRODE NUMBER | | | | | | | |
|---|---|---|---|---|---|---|---|---|
| | I | II | III | IV | V | VI | VII | VIII |
| M | 3 | 2 | 1 | 0 | 3 | 2 | 1 | 0 |
| L | 4 | 3 | 2 | 1 | 4 | 3 | 2 | 1 |
| K | 5 | 4 | 3 | 2 | 5 | 4 | 3 | 2 |
| J | 6 | 5 | 4 | 3 | 6 | 5 | 4 | 3 |
| I | 7 | 6 | 5 | 4 | 7 | 6 | 5 | 4 |
| H=N | 48 | 47 | 46 | 45 | 48 | 47 | 46 | 45 |
| G | 9 | 8 | 7 | 6 | 9 | 8 | 7 | 6 |
| F | 10 | 9 | 8 | 7 | 10 | 9 | 8 | 7 |
| E | 11 | 10 | 9 | 8 | 11 | 10 | 9 | 8 |
| D | 12 | 11 | 10 | 9 | 12 | 11 | 10 | 9 |
| C | 13 | 12 | 11 | 10 | 13 | 12 | 11 | 10 |
| B | 14 | 13 | 12 | 11 | 14 | 13 | 12 | 11 |
| A | 15 | 14 | 13 | 12 | 15 | 14 | 13 | 12 |

FIG. 5

SAMPLE VALUES AFTER DEPTH ADJUSTMENT

| DEPTH | ELECTRODE NUMBER | | | | | | | |
|---|---|---|---|---|---|---|---|---|
| | I | II | III | IV | V | VI | VII | VIII |
| D1 | | | | 0 | | | | 0 |
| D2 | | | 1 | 1 | | | 1 | 1 |
| D3 | | 2 | 2 | 2 | | 2 | 2 | 2 |
| D4 | 3 | 3 | 3 | 3 | 3 | 3 | 3 | 3 |
| D5 | 4 | 4 | 4 | 4 | 4 | 4 | 4 | 4 |
| D6 | 5 | 5 | 5 | 45 | 5 | 5 | 5 | 45 |
| D7 | 6 | 6 | 46 | 6 | 6 | 6 | 46 | 6 |
| D8 | 7 | 47 | 7 | 7 | 7 | 47 | 7 | 7 |
| D9 | 48 | 8 | 8 | 8 | 48 | 8 | 8 | 8 |
| D10 | 9 | 9 | 9 | 9 | 9 | 9 | 9 | 9 |
| D11 | 10 | 10 | 10 | 10 | 10 | 10 | 10 | 10 |
| D12 | 11 | 11 | 11 | 11 | 11 | 11 | 11 | 11 |
| D13 | 12 | 12 | 12 | 12 | 12 | 12 | 12 | 12 |
| D14 | 13 | 13 | 13 | | 13 | 13 | 13 | |
| D15 | 14 | 14 | | | 14 | 14 | | |
| D16 | 15 | | | | 15 | | | |

| DEPTH (in) | i | ELECTRODE (j) | | | | | | | | | | | | | | | | | | | | | | | | | | |
|---|---|---|---|---|---|---|---|---|---|---|---|---|---|---|---|---|---|---|---|---|---|---|---|---|---|---|---|---|
| | | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
| 7.2 | 18 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 7.6 | 19 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 |
| 8.0 | 20 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 |
| 8.4 | 21 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 8.8 | 22 | 5 | 5 | 5 | 5 | 5 | 5 | 25 | 5 | 5 | 5 | 25 | 5 | 5 | 5 | 25 | 5 | 5 | 5 | 25 | 5 | 5 | 5 | 25 | 5 | 5 | 5 | 25 |
| 9.2 | 23 | 6 | 26 | 6 | 6 | 6 | 26 | 6 | 6 | 6 | 26 | 6 | 6 | 6 | 26 | 6 | 6 | 6 | 26 | 6 | 6 | 6 | 26 | 6 | 6 | 6 | 26 | 6 |
| 9.6 | 24 | 27 | 7 | 7 | 7 | 27 | 7 | 7 | 7 | 27 | 7 | 7 | 7 | 27 | 7 | 7 | 7 | 27 | 7 | 7 | 7 | 27 | 7 | 7 | 7 | 27 | 7 | 7 |
| 10.0 | 25 | 8 | 8 | 8 | 8 | 8 | 8 | 8 | 8 | 8 | 8 | 8 | 8 | 8 | 8 | 8 | 8 | 8 | 8 | 8 | 8 | 8 | 8 | 8 | 8 | 8 | 8 | 8 |
| 10.4 | 26 | 9 | 9 | 9 | 9 | 9 | 9 | 9 | 9 | 9 | 9 | 9 | 9 | 9 | 9 | 9 | 9 | 9 | 9 | 9 | 9 | 9 | 9 | 9 | 9 | 9 | 9 | 9 |

FIG. 7

METHOD AND APPARATUS FOR FILTERING DATA SIGNALS PRODUCED BY EXPLORATION OF EARTH FORMATIONS

FIELD OF THE INVENTION

This invention relates to method and apparatus for reducing or eliminating spurious artifacts tending to appear in two-dimensional displays of logging information obtained by moving an array of sensors along a surface of an earth formation, for example along the wall of a bore-hole made in the course of exploring for petrochemical substances.

BACKGROUND OF THE INVENTION

In the exploration of earth formations, it is known to move an array of sensors along an exposed surface of the earth formation, typically along the exposed wall of a bore-hole in the earth, to produce data signals representative of variations in certain meaningful characteristics of the adjacent earth formation. For example, this is commonly done in the so-called logging of bore holes, in search of natural deposits of oil. Typically also, the data signals produced by the sensors are in electrical form, or are converted thereto.

A common form of sensor system used for this purpose injects current from an electrode array into the adjacent earth formation and measures variations in that current and/or in a voltage related to the current. It is also possible to use an array of electrodes to sense variations in a potential known as the spontaneous potential or SP, which appears naturally along the explored wall. In either case, the electrical signals vary in accordance with certain characteristics of the adjacent earth formation, and can therefore be used to characterize that formation.

While it is possible to obtain some useful information in such systems which use only a single sensor, significant advantages result from using systems containing an array of multiple sensors to obtain the data signals, and using the data signals so derived to produce a two-dimensional image corresponding to an area of the bore-hole wall extending both along, and at right angles to, the direction of motion of the sensor array. One such system, commonly known as a Formation Microscanner or FMS ™, conveys to an experienced observer a clearer mental picture of the distribution of the measured characteristic over a segment of the bore-hole wall than does a single-line graph of data produced by a single sensor.

One way in which to collect data to produce a two-dimensional image of a bore-hole wall would be to use a linear array of sensors, i.e., one in which the sensors are all distributed along a straight line, at right angle to the direction of motion of the array. In this way, the data collected would span two dimensions: at any given time the array of sensors would be collecting data along the azimuth direction (i.e., the direction transverse to the array motion along the bore-hole wall) and, over time, the array would be moved to successive different positions along the bore-hole wall.

In any sensor system, the individual sensors need to be sufficiently separated one from another to reduce the possibility that the sensors will interfere with one another in their operation; for example, sensor electrodes will electrically short-circuit to each other if they are placed too close together in the array. However, a deleterious result of such sensor separation in a linear array is the decrease in the resolution of the final image in the azimuth direction, or an increase in undesirable aliasing problems; in this connection see U.S. Pat. No. 4,567,759 of Ekstrom et al, issued Feb. 4, 1986.

One way to accommodate the sensor separation requirement and still achieve satisfactory azimuth resolution is to use a system in which the array of sensors is distributed in a two-dimensional pattern, so that the sensors span the azimuth direction with increased resolution (i.e., there are a larger number of sensors per unit of distance along the azimuth direction) while still being sufficiently separated one from another. One such sensor pattern positions the sensors across the array in a zig-zag pattern, whereby the sensors are very closely spaced, or even overlapping, along the azimuth direction, but are separated into rows such that adjacent azimuth sensors are in different rows. As such a sensor array is pulled along the bore-hole wall, the sensor array sweeps out a continuous, or more nearly continuous, area of the bore-hole wall than if a single row of sensors was used, and yet provides the necessary separation between electrodes.

At any given time, the array of sensors will be producing data corresponding to different positions on the bore-hole wall, both in the azimuth direction and in the logging direction, corresponding to the different positions of the sensors distributed on the face of the probe. For simplicity, position along the logging direction will be referred to herein as "depth," even though the logging direction is not necessarily limited to being purely vertical. In order to achieve maximal resolution, these different positions need to be taken into account when the data is presented in image form. More particularly, the depths associated with the sensor data from individual sensors need to be adjusted to ensure that all the data are presented for depths corresponding to those at which the sensors were when the data was produced. A system of this type using depth adjustment of the data is described, for example, in the above cited Ekstrom et al patent.

While two-dimensional display systems have proved to be effective for their intended purposes, as with nearly all measuring systems their maximum useful sensitivity and accuracy is limited by the presence in the data signals of variations which do not represent the characterics to be detected. Such undesired, false, or spurious signal components will be designated herein as "noise," to distinguish them from "true" data signals, without thereby suggesting that they are necessarily random.

When the desired, true data signals are large compared to the level of noise, noise is not as much of a problem as when the desired, true data signals are relatively small. For example, in usual bore-hole exploration, a water-based "mud" is used in the bore-hole which helps to support the bore-hole walls physically, and also provides a medium of rather high electrical conductivity for current flowing between sensors and bore-hole wall. With such a high-conductivity mud, it is relatively easy to obtain data signals sufficiently large compared to the level of noise to be practical for commercial FMS ™ bore-hole exploration. However, it is sometimes desirable for certain purposes to use an oil-based mud, which has a much lower conductivity than usual water-based muds, and this lower conductivity reduces the strength of the desired, true data signals so that they are more easily obscured by noise signals.

Accordingly, in this situation, it is especially desirable to discriminate against noise signals and to reduce their effects on the two-dimensional signal display.

One type of noise which can adversely affect the results of bore-hole exploration is designated herein as "one-dimensional" noise, since it varies primarily as a function of the position of the entire sensor array along its direction of motion, but is substantially the same for all sensor positions in the array. When such one-dimensional noise occurs in a system in which the sensors are distributed in a two-dimensional array, all of the sensors will be affected by the noise at the same time. After the data is depth-adjusted to take into account the vertical distribution of the sensors on the probe face, the noisy data will appear as anomalous artifacts in the final image in the shape of "footprints" of the pattern of sensors in the array. For example, where the sensors extend across the array in a zig-zag pattern, the artifacts are in the form of a corresponding set of zig-zags.

Accordingly, it is an object of the present invention to provide a new and useful signal filtering method and apparatus for reducing or eliminating certain artifacts which may appear in an electrically-derived two-dimensional image of an earth formation due to one-dimensional noise signals present in a two-dimensional array of logging sensors.

Another object is to provide a method and apparatus for reducing or eliminating artifacts of zig-zag form which tend to be produced in such a two-dimensional image by one-dimensional noise signals from a two-dimensional array of logging sensors arranged along zig-zag lines. A further object is to provide a method and apparatus for producing more accurate, and more readily interpreted, two-dimensional images of certain characteristics of a bore-hole wall.

SUMMARY OF THE INVENTION

These and other objects of the invention are obtained by the provision of a filtering method and apparatus which filter the combined noise and true data signals produced by an array of staggered sensors, to reduce or eliminate undesired artifacts otherwise produced in the two-dimensional image after depth adjustment of the noise and data signals from the sensors. This filtering method and apparatus makes use of the facts that the so-called one-dimensional noise components from the sensors are generated all at the same time, while data signals for any given geological feature at a given depth along the wall of the earth formation are captured at different, but known, times by sensors in different rows of the array; that measured data containing both noise and true data are depth-shifted by the same known amounts prior to application to the image-display device, thereby giving the undesired noise artifacts their characteristic shape; and that geologic features tend to change only slightly and/or gradually along the azimuth direction, e.g., in horizontal planes. In performing its function, the filtering method and apparatus of the invention take advantage of these facts in generating correcting signals n corresponding to the noise components which produce the above-described artifacts, these correcting signals n being subtracted from the measured signals M to arrive at the desired, true data signals $S = M - n$. The values of n so subtracted are equal for all samples produced at the same sampling time.

More particularly, $S(i,j) = M(i,j) - n(k)$, where:

i is an integer index identifying the depth at which an electrode sample is taken, preferably in units corresponding to the distance the array moves between samplings of the signal levels at the sensors of the array;

j is an integer index identifying the azimuth position of the sensors in the array (e.g., at right angles to the direction of motion of the array), numbered from one side to other of the array;

k is an integer index identifying the depth of the array corresponding to the time when the data was collected at position (i,j); S(i,j) represents the true data values in the signal for position (i,j);

M(i,j) represents the measured values of true signal plus noise for position (i,j); and n(k) is the electronically generated, estimated value for the one-dimensional noise in the frame of data collected when the array was at depth k.

k is preferably represented as $i - g(j)$, where g(j) is a function identifying the relative depth of each sensor at azimuth position j, measured with respect to the sensors of the top row, this relative depth preferably being an integer multiple of the distance the array moves between samplings, that is, g(j) is preferably in units of i. As such, k, the depth of the array, is preferably also the depth of the sensors of the top row of the array, and g(j) is preferably 0 for those azimuth positions j which correspond to sensors in the top row.

For example, in a case described hereinafter using four rows of electrodes equally spaced along the direction of logging motion, and with the array moved by the full inter-row spacing between successive sampling, g(j) may be expressed as R[j], where R[j] is the remainder of the quotient j/4 and j is numbered consecutively in the azimuth direction, from one side of the array to the other, starting with an electrode at one end which is in the second row, as will appear later herein; in this case $k = i - R[j]$, each value of k identifying a different zig-zag set of simultaneously produced data samples among the depth-adjusted samples M(i,j).

Each true signal value S(i,j) is obtained by subtracting from the measured value M(i,j) an estimated noise value $n(k) = n[i - g(j)]$ evaluated for the same values of i and j. Since geologic features change only slowly along the azimuth direction, the true data signals produced by azimuthally-adjacent sensors should be roughly the same, i.e.:

$$S(i,j) - S(i,j+1) \approx 0.$$

Using this fact, signals having the values n(k) are generated from the M(i,j) signal samples and from the array configuration function g(j) in a manner which minimizes the discontinuities, or differences, between the values of depth-adjusted samples produced by azimuthally-adjacent sensors.

This is preferably done by generating in a computer the values of n(k) which minimize the image discontinuity measure I, where:

$$I = \sum_i \sum_j \{S(i,j) - S(i,j+1)\}^2,$$

or, substituting M−n for S, $$I = \sum_i \sum_j \{M(i,j) - n[i - g(j)] - M(i,j+1) + n[i - g(j+1)]\}^2.$$

The image discontinuity I is minimized when its partial derivatives with respect to the estimated noise n(k)

are zero. Accordingly, n(k) preferably has values which satisfy the set of linear simultaneous equations obtained by setting $\partial I/\partial n(k)=0$, and set forth in detail hereinafter.

The solution n(k) to this set of linear simultaneous equations is expressible through mathematical manipulation as:

$$n(k) = \sum_{x=1}^{D} T^{-1}(k,x) \cdot y(x),$$

where $\underline{T}^{-1}$ is the inverse of the matrix $\underline{T}$ which represents in matrix form the coefficients of the noise terms in the above-mentioned set of linear simultaneous equations, x represents the summation parameter and runs from 1 to D, where D is the total number of frames in the image, k and x are also the indices of the inverse matrix $\underline{T}^{-1}$, and y is a function of x containing all terms in M resulting from the above-described partial differentiation of the discontinuity measure I.

In the preferred embodiment, the computer does not perform all of the many calculations implicit in the last equation for n(k), since they are so many and so burdensome. Instead, it is preferred to evaluate n(k) using a mathematical sliding window of width w. The smaller the value of w selected, the simpler is the computation of n(k), although the accuracy of the calculation may decrease when smaller values of w are used. A reasonable compromise in many cases is to select w=11. The preferred form for n(k) is then:

$$n(k) = 1/w \sum_{k_1=1}^{w} \sum_{k_2=1}^{w} T^{-1}(k_1,k_2) \cdot y(k + k_1 - k_2),$$

where $k_1$ and $k_2$ are the indices of the inverse matrix $\underline{T}^{-1}$, and y is now a function of $k+k_1-k_2$ containing all terms in M resulting from the above-described partial differentiation of the discontinuity measure I.

BRIEF DESCRIPTION OF FIGURES

These and other objects and features of the invention will be more readily understood from a consideration of the following detailed description, taken with the accompanying drawings, in which:

FIG. 1 is a schematic vertical section showing a bore hole and apparatus for conducting logging of the bore-hole wall, in which the present invention is useful;

FIG. 1A is an enlarged fragmentary view showing the part of the system of FIG. 1 which carries the logging array;

FIG. 1B is a fragmentary perspective view showing a probe pad which may be used in the apparatus of FIG. 1A;

FIGS. 3, 4, and 5 are tables and diagrams to which references will be made in explaining the nature of the problem which the invention solves;

FIG. 7 is a table of hypothetical, assumed values of electrode signal samples at various depths of the array, to which reference will be made in explaining the manner in which the invention in one of its forms may be applied;

DETAILED DESCRIPTION OF PREFERRED EMBODIMENTS

Overall System

Figure 2:
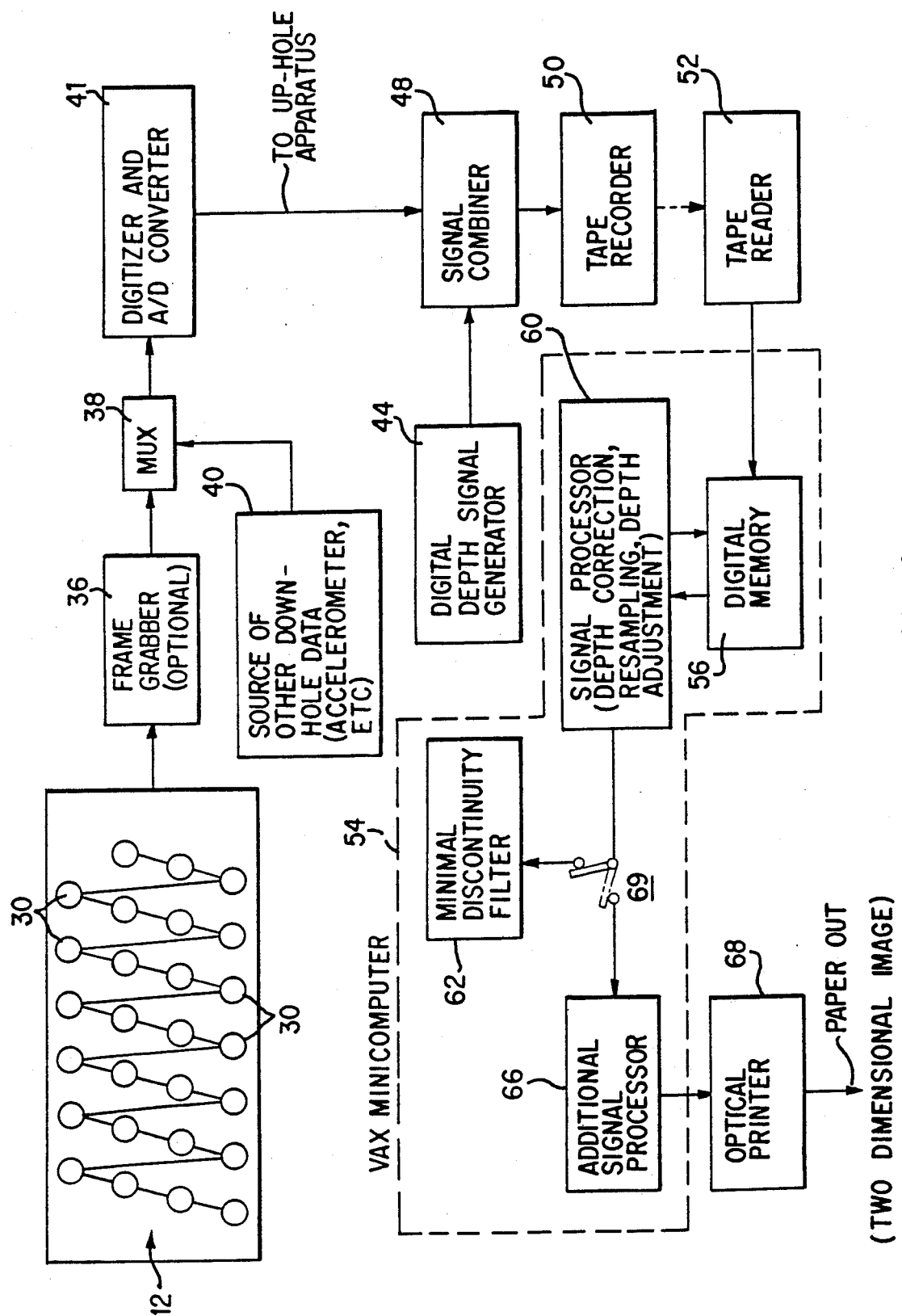
FIG. 2 is a block diagram of the electrical elements of the system of FIG. 1, including apparatus operating in accordance with the invention.

Referring now to the specific preferred embodiments of the invention shown in the drawings by way of example only, FIG. 1 illustrates one known type of system to which the invention is applicable. In this system a logging tool 10 carries a set of four pads such as 12 which are urged outwardly against the interior wall 14 of a bore-hole 16 extending vertically into the earth 17. The tool and the pads are pulled upwardly by a pulling cable 22, which extends around appropriate sheaves such as 23, 24, supported by tower 25, to a winch 26 on a vehicle 28 having an engine 29 for operating the winch, preferably to pull the tool and pads upwardly at a uniform velocity. The pulling cable preferably is provided with an outer metallic armor, and contains wires enabling two-way electrical communication between the vehicle and the tool in the bore hole.

Each pad 12 carries a two-dimensional array of sensors such as 30, which may be simple recessed electrodes electrically insulated from each other, positioned to be moved along the bore-hole wall as the pads are pulled upwardly in contact with the walls. In the case of the system known as the Formation Microsensor (FMS ™), a voltage is preferably applied between each electrode and a remote reference electrode, for example the conductive armor surrounding the pulling cable, to inject a current into the adjacent earth; in a system for logging spontaneous potential SP, no such voltage need be applied.

Referring particularly to FIG. 2, in one simple example the pad 12 may contain 4 rows of electrodes such as 30, the top row containing 6 electrodes while rows 2 through 4 contain 7 electrodes each, for a total of 27 electrodes. The rows are staggered with respect to each other azimuthally so as to lie along a sawtooth path, as suggested by the schematic sawtooth lines joining the electrodes in FIG. 2, where "azimuth" designates a direction at right angles to the logging direction, i.e., the horizontal direction for the usual vertical pull. As the pad is pulled upwardly, the top row of electrodes traverses six azimuthally spaced-apart vertical lines on the bore-hole wall, while each of the other three rows of electrodes traverses seven different vertical lines, azimuthally spaced from each other and from the first row of electrodes, so as to "fill in" the spaces between the electrodes of the top row and therefore scan the entire wall segment traversed by the array during the pulling operation. It will be understood that this resolution of scanning cannot be accomplished by using a single row of electrodes, since the electrodes would be electrically short-circuited to each other if placed close enough together to overlap azimuthally.

The signals at each of the electrodes are supplied to a sampling circuit, in this example represented as sample-and-hold circuit in the form of a frame-grabber 36, which is actuated at predetermined intervals to capture and store successive frames of data signal values from all electrodes as the array is being pulled upward. Thus, successive frames of 27 electrode signal values are stored, for example at increments of 0.1 inch of motion of the array. The data signals captured in each frame by the frame grabber are then sampled successively by MUX 38, which typically also time-multiplexes other conventional data produced by a source 40 of other down-hole data, such as accelerometer data useful in connection with determining accurately the depth of the tool at any time. While the use of a frame grabber is preferred from the viewpoint of obtaining data from the array of electrodes at exactly the same times in each frame, it involves some degree of complexity in the down-hole apparatus; accordingly, when simplicity is economically important it is preferred to sample the electrodes sequentially with the MUX during each frame and to compensate for the differences in electrode sampling times in the up-hole apparatus.

The sampled data from MUX 38 are changed to digital form by digitizer and A/D converter 41, and sent up-hole to the surface vehicle 28 (FIG. 1) over a line within the pulling cable 22. In an electronics unit in the vehicle, a conventional digital depth-signal generator 44 produces depth data accurately representing the depth of the array at which each frame of electrode signal data is produced, and a signal combiner 48 associates each digital electrode signal sample with a depth number i defining the depth at which the sample was produced, and with an electrode number j identifying the electrode which produced it. These combined raw data are preferably stored, as in a tape recorder 50 or in any other suitable memory device, until the data are to be used, whether at the vehicle or at any other convenient data-analyzing station.

In the FIG. 2 system, the tape from the tape recorder is later read in tape reader 52, and the resultant data fed to a minicomputer such as VAX computer 54 for example, wherein each sample and its associated identifying values of i and j are stored in a digital memory 56 and thereafter processed in the signal processor 60, in the minimal discontinuity filter 62 described below, and in any desired conventional additional signal processor 66, prior to application to optical printer 68, which produces a paper output displaying a two-dimensional image of the segment of the bore-hole wall scanned by the electrode array during the logging pull; the printer may also provide individual waveforms of the signals produced at the respective electrodes. A switch 69 is also shown to indicate schematically that the minimal discontinuity filter can be inserted into the system as described above, or bypassed by the switch when the operation of the filter is not desired.

As shown, the mini-computer 54 provides within it the signal processor 60, and also the minimal discontinuity filter 62 of this invention through which the depth-adjusted electrode signals are passed prior to their application to the optical printer 68 where the final two-dimensional image is formed. It will be understood that while the depth adjustment, filtering, and other signal processing are usually performed by programming of the computer 54, they can be performed by appropriate hardware.

Problem Presented

Figure 3:
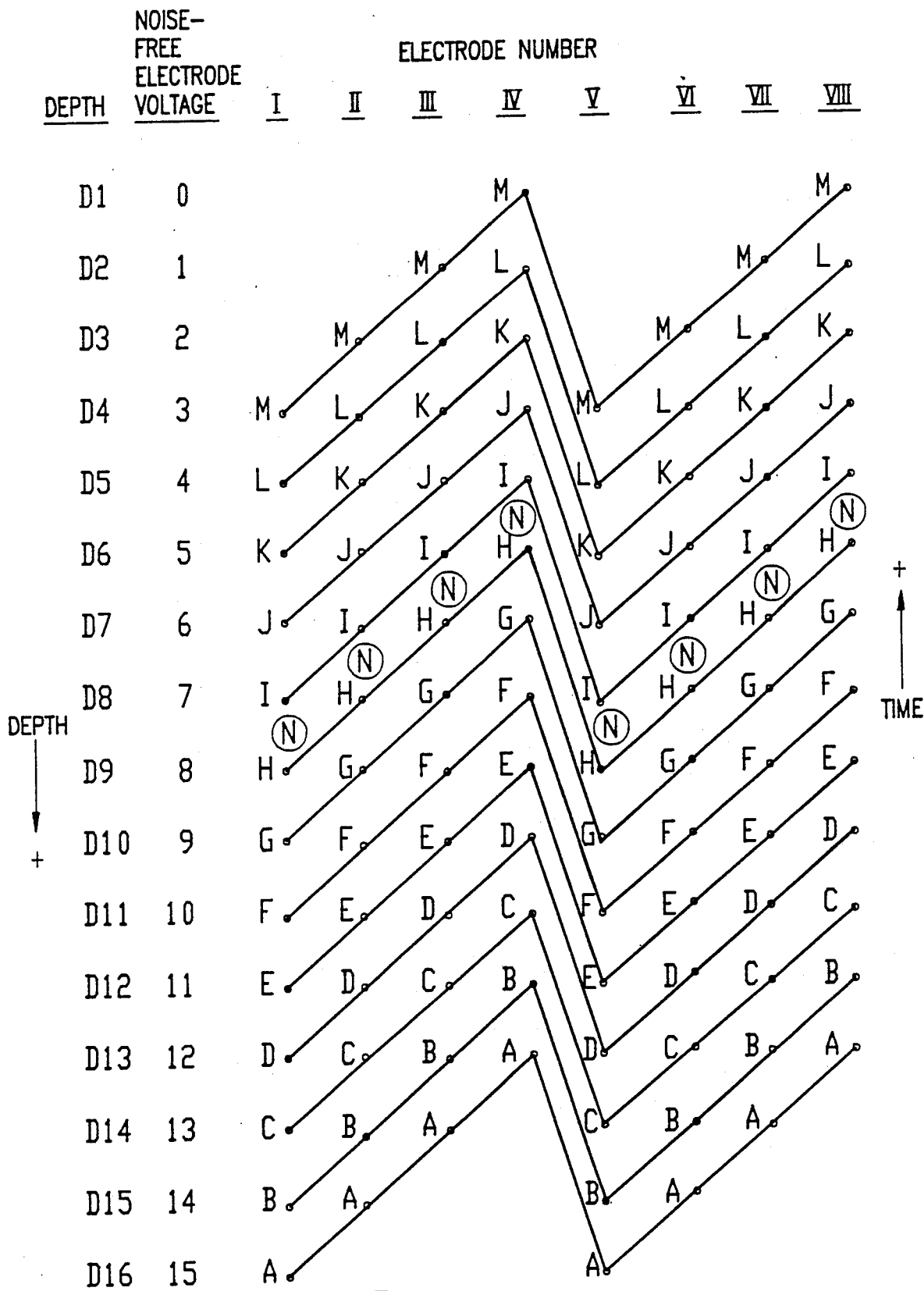

The nature of the problem which the filter of this invention attacks will become clearer from a consideration of the schematic and idealized FIGS. 3 through 5. In FIG. 3, depths of the electrode array 12 below the surface of the earth are indicated in the column at the left by D1 through D16; the next column to the right indicates hypothetical "true" signal values assumed to be produced at the electrodes, at corresponding depths, in the absence of noise.

To the right of the column of hypothetical, noise-free electrode voltages is shown schematically an array of 4 rows of electrodes arranged in a sawtooth configuration, in 13 successively higher positions during a logging pull. Only two electrodes per horizontal row are shown, rather than the six or seven shown in the array 12 of FIG. 2, and the array is shown at sampling positions spaced vertically from each other by the entire distance between rows, in the interest of compactness of representation. The eight electrodes are identified by azimuth parameter j with values I through VIII.

More particularly, at time A the staggered array of eight electrodes is in the lowermost position shown, and each dot marked A represents an electrode of that array which produces a data signal corresponding to a characteristic of the earth formation at the depth of the electrode at that time. The line segments joining the electrodes A are schematic, and indicate that the electrodes so joined are all part of the same array, and are disposed in staggered positions along a sawtooth line, that is, no two electrodes are aligned with each other along the direction of logging motion. It is assumed that the frame grabber of FIG. 2 is actuated at the times A, B, C, D, etc., so that the signal values, at the electrode positions shown, are sampled, digitized, and sent up-hole in digital form, one frame for each position of the array.

The next-higher position of the array above position A, for which the next frame of electrode data is captured by the frame grabber, is designated by B in FIG. 3, and so on for successively higher positions of the array designated as C through M.

From FIG. 3 it will be seen that to obtain eight electrode signals which correspond to the same depth, it is necessary to select samples produced during different frames, at different times; for example at depth D12, the electrodes providing the information are, reading from left to right, those from frame times E, D, C, B, E, D, C and B.

This relation is depicted in detail in FIG. 4, wherein the first, or left-most, column lists the frame sample times of FIG. 3, and the rows of numbers in columns I through VIII show the signal values on each of the electrodes at the times indicated in the first column corresponding to the hypothetical true values in the second column of FIG. 3. The frames of raw data samples shown in FIG. 4 are sent up-hole in serial bit form, for example, first Frame A from left to right, then Frame B from left to right, and so on. Since the data collected at the same time correspond to positions at four different depths within the bore hole, the data need to be depth-adjusted in order to create a proper image of the bore-hole wall.

For example, to create the portion of the image corresponding to depth D12, it is necessary to access data collected during sampling times B, C, D, and E. Specifically, depth D12 is characterized by selecting the following electrode-sample time combinations from the table of FIG. 4: I-E, II-D, III-C, IV-B, V-E, VI-D, VII-C, and VIII-B, yielding the data presented for depth D12 in the table of FIG. 5. Since the relative positions of these samples are known from the geometry of the array, the signal processor in the up-hole electronic is easily programmed to accomplish such appropriate selection of samples to constitute properly each horizontal line of the final two-dimensional image.

The problem produced by so-called one-dimensional noise, i.e., noise which is a function of time but is the same for all electrodes at a given time, is illustrated qualitatively for sample time H in FIGS. 3 and 4, and in the portion of FIG. 5 marked by the sawtooth-shaped line. Here it is assumed that at time H only, a strong noise signal occurs, increasing the signal levels on all electrodes by 40 units. More particularly, as shown in FIG. 3, all eight electrodes at time H, although at different depths, carry the noise of 40 units superposed on their true signal values. As shown in FIG. 4 at time H, this frame when multiplexed is made up entirely of samples of a high, anomalous value which, if applied directly to the image-display apparatus after depth adjustment, will produce a strong sawtooth pattern, as depicted by the dashed line in FIG. 5.

More particularly, as shown in FIG. 5, depth-adjustment serves to group the data samples into the proper depth sets as desired, but the data from the noise-augmented frame at time H are disposed along the zig-zag path shown in FIG. 5, and specifically along a sawtooth locus corresponding to the positions of the electrodes in the array, so as to constitute, in effect, the "footprint" of the array of electrodes. It is this spurious sawtooth artifact which the filter of this invention removes or greatly reduces in strength, by generating from the measured signals certain estimated values for the one-dimensional noise which, when subtracted from the depth-adjusted samples, in effect cancel out the undesired, spurious, one-dimensional noise artifacts.

Analysis for the Minimal Discontinuity Filter

The minimal discontinuity filter of this invention involves the following five aspects of the bore-hole logging apparatus and procedure for which this filter is designed:

(1) The configuration of the array used to measure the physical features of the bore hole;

(2) The manner in which data is collected using that array;

(3) The effect that the one-dimensional noise has on the data collected using that array;

(4) The nature of that noise for which this minimal discontinuity filter is designed; and (5) The nature of the physical features of the bore hole that are being measured by that array.

Figure 6:
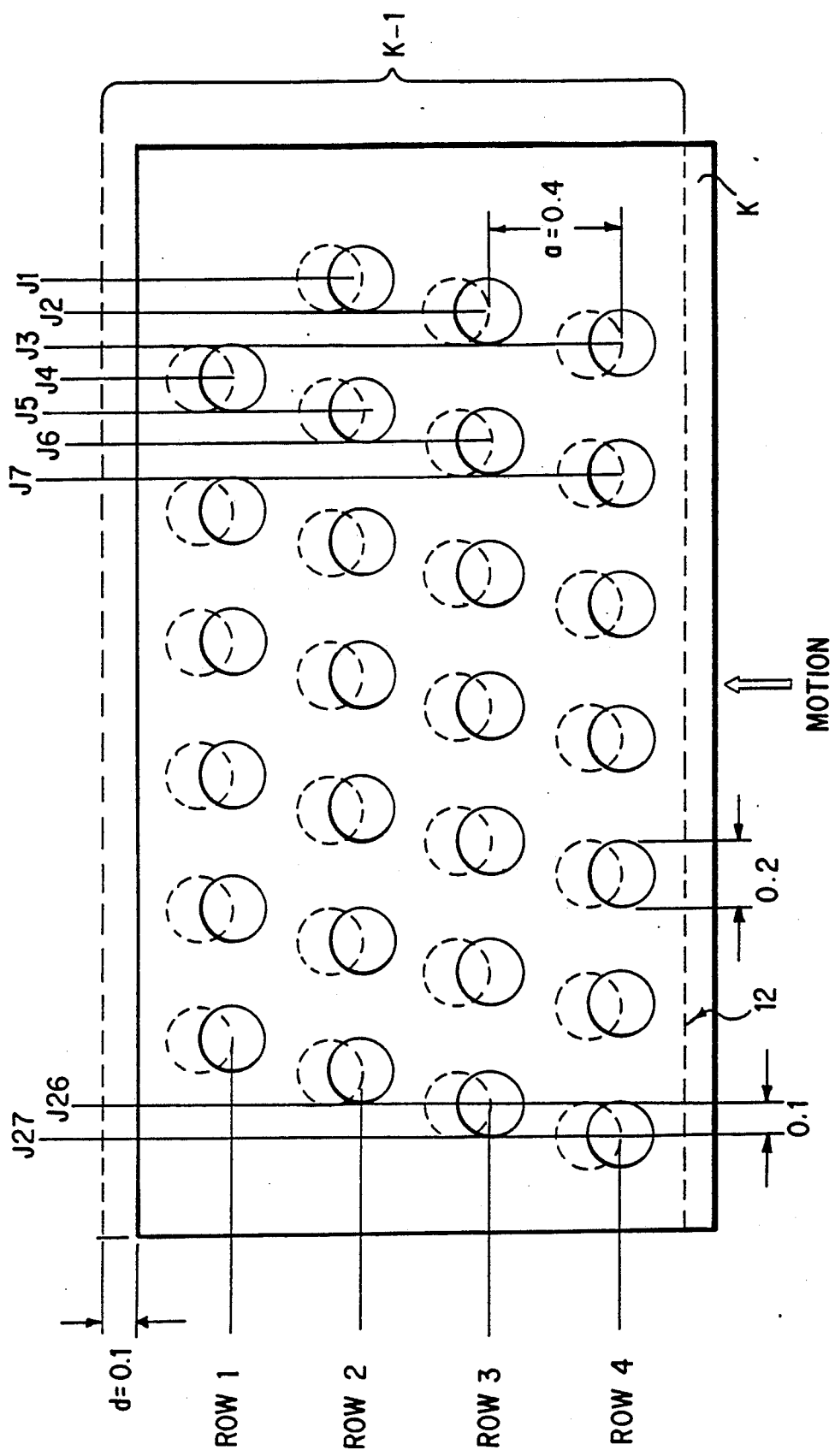
FIG. 6 is a schematic diagram of a sensor array, showing a representative electrode configuration and specific array dimensions usable in connection with one application of the invention.

In this discussion, for the purpose of simplicity of analysis, the usual case will be assumed in which the bore hole is vertical. Without limiting the scope of the invention, FIG. 6 illustrates various of the parameters referred to in the following analysis, for the 27-electrode array shown, for the $k^{th}$ position of the array; the broken lines indicate the position of the array when the next frame of samples is taken at depth $k-1$.

1. Configuration of the Array

The probe used to measure the physical features of the bore hole includes an array of sensors (e.g., electrodes) which are oriented in some known, fixed two-dimensional pattern on the face of the probe. The integer parameter j is used to identify the azimuth location of each of the sensors of the array, where the $j^{th}$ and $(j+1)^{th}$ sensors are next to each other in terms of azimuth (i.e., horizontal) direction.

The function g(j) defines the vertical location of the sensors relative to some vertical reference position on the probe face as a function of the parameter j. For example, if the vertical reference position is the topmost sensor in the array, then g(j) is the positive ordinal distance the $j^{th}$ sensor is below the sensor (or sensors) at the top of the array of sensors on the probe face, where "top" means highest in the vertical direction.

2. Data Collection Using the Bore-Hole Logging Probe

The bore hole is logged by slowly pulling the probe up out of the hole with the sensors of the probe face exposed to the hole surface. As the probe is pulled up the hole, data is collected periodically to sample the physical features of the hole at fixed depth intervals. If the probe is pulled up the hole at a uniform rate, then sampling the data at a fixed time interval will result in the sampling of data at constant depth intervals, represented by the constant d.

If the pattern of sensors on the probe face and the depth sampling interval are selected properly, then, at any given time, each sensor will be scanning the bore-hole wall at a unique azimuth position and, except for the leading or top row of sensors, at a depth that was characterized previously by other sensors at other azimuth positions during other data sampling times. The distance (called a) between the centers of adjacent rows of sensors is preferably an integral multiple, including 1, of the distance d which the probe travels between successive samplings, so as to assure that data will be collected for all of the azimuth positions at each depth position.

However, as a practical matter it is not possible to move the probe at a perfectly uniform speed, primarily because of variable sticking of the probe along the borehole wall combined with the resultant elastic stretching and re-contracting of the pulling line; thus even if the rate of pulling of the surface end of the pulling line is constant, in general the speed of the probe will be subject to variation. Nevertheless, using techniques now known and used in the art, later processing in signal processor 60 produces signals representative of the value of the logging signal at intervals a along the borehole wall, as desired. This is accomplished by using the accelerometer data to obtain accurate information as to the exact position of the array of electrodes at all times, and specifically at the times of the samplings of the electrode signal volume. By interpolating between the depth and sample-time data, data providing continuous information as to electrode signal values is generated for all depths; by resampling the latter data at the times corresponding to when the array is in the successive positions separated by the distance a, the desired data is obtained. This data interpolating and resampling is done in signal processor 60. For further details of such data processing operations, reference is made to the above-cited U.S. Pat. No. 4,567,759 and to U.S. Pat. No. 4,468,623 of Gianzero et al, issued Aug. 28, 1984. Accordingly, when reference is made herein to sampling the electrode signal values at certain times or at certain depth intervals, this should be taken to include the deriving of comparable samples by the signal processor 60 from raw down-hole data containing samples which were not necessarily taken at equal depth intervals.

Using the integer parameter k to identify the depth within the bore hole of the vertical reference position of the sensor array at any given sampling time, and the integer parameter i to identify the depth within the hole of any of the particular sensors at that same time, then the following relation is true:

$$k = i - g(j), \qquad \text{(Eq C1)}$$

which can be rewritten as:

$$i = k + g(j), \qquad \text{(Eq C2)}$$

where both i and k are parameters which correspond to integral numbers of sampling intervals d, and both increase as depth increases. Equations (C1) and (C2) express the fact that the function g(j) defines the vertical location of the $j^{th}$ sensor of the array relative to the sensor reference position. If the sensor reference position coincides with the top row of sensors in the array and if the $j^{th}$ sensor is in the top row, then g(j) will be 0 for that value of j, and i, the depth of that sensor, will be equal to k, the depth of the top row of sensors.

The parameter k can also be used to identify the depth of the array itself. When the array is at some depth k, the depth i of any sensor in the array can be found by substituting that value k and the appropriate j value for that sensor into Equation (C2). In this sense, at any given time, all of the sensors in the array are associated with the same value k. If the i,j values for each of the sensors are substituted into Equation (C1) for a given time, the resulting k values will all be the same, and will correspond to the k value representing the depth of the array at that time. Assuming that the vertical reference position coincides with the top row of sensors, the $k^{th}$ data frame is the frame of sensor data collected when the top row of sensors is at depth k (even though not all of the sensors in the entire array are at that depth at that time).

3. Effect of the One-Dimensional Noise on Measured Signals

By "one-dimensional" noise is meant noise which is a function of time, but which affects all sensors substantially equally. This one-dimensional noise affects the measured data signals substantially linearly. That is, the measured signal M(i,j) (i.e., the signal measured by sensor j at depth i) can be expressed as:

$$M(i,j) = S(i,j) + N(i,j), \qquad \text{(Eq C3)}$$

where
S(i,j) = the ideal or "true" signal corresponding to the characteristic of the bore-hole wall, measured at azimuth position j and at depth i, and
N(i,j) = the noise at sensor j when it is at depth i.
Solving for the ideal signal S(i,j), Equation (C3) becomes:

$$S(i,j) = M(i,j) - N(i,j). \qquad \text{(Eq C4)}$$

4. Nature of the One-Dimensional Noise

The one-dimensional noise, which this minimal discontinuity filter is designed to reduce, when it does occur, affects all of the sensors of the array at the same time and to substantially the same extent. This means that when the noise occurs, all of the sensors will have the same noise value added to them in accordance with Equation (C3).

Assume an array with E sensors whose relative positions on the probe face are defined by the function g(j). If noise occurs during data frame k, then the noise signals N(i,j) for all of the array sensors will have the same value, call it n(k), the noise associated with data frame k, where k is related to i and j by Equations (C1) and (C2). Thus:

$$N(i,j) = n[i - g(j)] = n(k) \qquad \text{(Eq C5)}$$

for all i,j values associated with the E sensors of data frame k.

5. Nature of the Physical Features of the Bore Hole

The physical features of the bore hole that are being measured by the probe typically vary very slowly along the azimuth direction. This can be represented mathematically as:

$$S(i,j) - S(i,j+1) \approx 0, \qquad \text{(Eq C6)}$$

where S(i,j) and S(i,j+1) are the ideal signals corresponding to two adjacent azimuth locations (j and j+1) at the same depth i within the bore hole.

Derivation of the General Form of the Minimal Discontinuity Filter

Since the difference between values of adjacent pixels within the image is ideally near zero, as expressed in Equation (C6), the noise N(i,j) associated with a particular location (i,j) (or image pixel) can be estimated by minimizing these differences, also called discontinuities, over the entire collection of data, where each discontinuity is of the form of the left side of Equation (C6). One way to express the total discontinuity over the entire image is by the sum of the squares of all the discontinuities over the entire image. Mathematically, this is expressed as:

$$I = \sum_{i=1}^{D} \sum_{j=1}^{E-1} \{S(i,j) - S(i,j+1)\}^2, \qquad \text{(Eq C7)}$$

where
I = the measure of the total discontinuity of the entire image,
D = the number of depth samplings that composes the entire image, and
E = the number of sensors in the array used to obtain the data.
Substituting Equation (C4) into Equation (C7) yields:

$$I = \sum_{i=1}^{D} \sum_{j=1}^{E-1} \{M(i,j) - N(i,j) - M(i,j+1) + N(i,j+1)\}^2 \qquad \text{(Eq C8)}$$

Using the fact that the noise is the same for each sensor at a given time, the identity of Equation (C5) is used to rewrite Equation (C8) as:

$$I = \sum_{i=1}^{D} \sum_{j=1}^{E-1} \{M(i,j) - n[i - g(j)] - M(i,j+1) + n[i - g(j+1)]\}^2 \qquad \text{(Eq C9)}$$

Estimates of the noise n[i−g(j)] can be obtained by minimizing the total discontinuity I. This can be accomplished mathematically by setting equal to zero the partial derivative of I with respect to the estimated noise n(k) of the generic data frame k, and then solving for the estimated noise, viz:

$$\frac{\partial I}{\partial n(k)} = \quad \text{(Eq C10)}$$

$$\sum_{i=1}^{D} \sum_{j=1}^{E-1} 2\{M(i,j) - n[i - g(j)] - M(i,j+1) + n[i - g(j+1)]\}$$

$$\left\{ \frac{\partial M(i,j)}{\partial n(k)} - \frac{\partial n[i-g(j)]}{\partial n(k)} - \frac{\partial M(i,j+1)}{\partial n(k)} + \frac{\partial n[i-g(j+1)]}{\partial n(k)} \right\} = 0$$

But:

$$\frac{\partial M(i,j)}{\partial n(k)} = \frac{\partial M(i,j+1)}{\partial n(k)} = 0, \text{ for all values of } i, j, \text{ and } k \quad \text{(Eq C11)}$$

$$\frac{\partial n[i - g(j)]}{\partial n(k)} = 0, \text{ for } i - g(j) \text{ not } = k \quad \text{(Eq C12)}$$

$$\frac{\partial n[i - g(j)]}{\partial n(k)} = 1, \text{ for } i - g(j) = k \quad \text{(Eq C13)}$$

$$\frac{\partial n[i - g(j+1)]}{\partial n(k)} = 0, \text{ for } i - g(j+1) \text{ not } = k \quad \text{(Eq C14)}$$

$$\frac{\partial n[i - g(j+1)]}{\partial n(k)} = 1, \text{ for } i - g(j+1) = k \quad \text{(Eq C15)}$$

Substituting Equation (C11) into Equation (C10) and dividing both sides of the equation by 2 yields:

$$\sum_{i=1}^{D} \sum_{j=1}^{E-1} \{M(i,j) - n[i - g(j)] - M(i,j+1) + \quad \text{(Eq C16)}$$

$$n[i - g(j+1)]\} \left\{ -\frac{\partial n[i-g(j)]}{\partial n(k)} + \frac{\partial n[i-g(j+1)]}{\partial n(k)} \right\} = 0$$

As expressed in Equation (C12) to (C15), all the terms in the double summation of Equation (C16) will be zero, except for those for which:

$$i - g(j) = k \quad \text{(Eq C17)}$$

or $$i - g(j+1) = k. \quad \text{(Eq C18)}$$

The conditions of Equations (C17) and (C18) can be rewritten:

$$i = k + g(j) \quad \text{(Eq C19)}$$

and $$i = k + g(j+1). \quad \text{(Eq C20)}$$

Applying the conditions of Equations (C19) and (C20) to the summation of Equation (C16) by first retaining only the terms which satisfy Equation (C19) by substituting $k+g(j)$ for i, and then retaining only the terms which satisfy Equation (C20) by substituting $k+g(j+1)$ for i, yields:

$$0 = \sum_{j=1}^{E-1} \{-M(k + g(j),j) + n[k + g(j) - g(j)] + \quad \text{(Eq C21)}$$

$$M(k + g(j), j+1) - n[k + g(j) - g(j+1)] +$$

$$M(k + g(j+1), j) - n[k + g(j+1) - g(j)] -$$

$$M(k + g(j+1), j+1) + n[k + g(j+1) - g(j+1)]\}$$

Recognizing that:

$$n[k+g(j)-g(j)] = n[k+g(j+1)-g(j+1)] = n(k), \quad \text{(Eq C22)}$$

Equation (C21) becomes:

$$0 = \sum_{j=1}^{E-1} \{-M(k + g(j),j) + n(k) + m(k + g(j), j+1) - \quad \text{(Eq C23)}$$

$$n[k + g(j) - g(j+1)] + M(k + g(j+1), j) -$$

$$n[k + g(j+1) - g(j)] - M(k + g(j+1), j+1) + n(k)\}$$

Rearranging Equation (C23) so that all the estimated noise terms n are on one side and all the measured signal M terms are on the other yields:

$$\sum_{j=1}^{E-1} \{2n(k) - n[k + g(j) - g(j+1)] - \quad \text{(Eq C24)}$$

$$n[k + g(j+1) - g(j)]\} = y(k),$$

where $$y(k) = \sum^{E-1} \{M(k + g(j),j) - M(k + g(j), j+1) - \quad \text{(Eq C25)}$$

$$M(k + g(j+1), j) + j = 1 \, M(k + g(j+1), j+1)\}$$

Equation (C24) expresses the relationship between the measured data (as represented by the value of y(k) defined by Equation (C25)) and the estimated noise (as represented by the left side of Equation (C24)) as a function of the data frame parameter k. Since this relationship is true for all the data collected, that is for all values of k, then the relationship of Equation (C24) is the characteristic equation for a set of k simultaneous linear equations which can be rewritten in matrix form to cover all the data collected:

$$y = T \cdot n, \quad \text{(Eq C26)}$$

where $$y = \begin{bmatrix} y(1) \\ y(2) \\ y(3) \\ \vdots \\ y(k-1) \\ y(k) \\ y(k+1) \\ \vdots \end{bmatrix} \quad \text{(Eq C27)}$$

$$n = \begin{bmatrix} n(1) \\ n(2) \\ n(3) \\ \vdots \\ n(k-1) \\ n(k) \\ n(k+1) \\ \vdots \end{bmatrix} \quad \text{(Eq 28)}$$

and $\underline{T}$ = the (D×D) matrix which represents in matrix form the coefficients of the estimated noise terms in the set of linear equations defined by the relationship of Equation (C24) and D is the total number of data frames in the entire image. The estimated noise terms are found by expanding the summation of the left hand side of Equation (C24) and reducing by combining similar terms.

Equation (C26) can be inverted to solve for the estimated noise matrix n:

$$n = \underline{T}^{-1} \cdot y, \quad \text{(Eq C29)}$$

where $\underline{T}^{-1}$ = the inverse of matrix $\underline{T}$.

In principle, a value of n(k) can be obtained for each value of k for values of k from 1 to D by solving Equation (C29) using the inverse of the entire (D×D) matrix $\underline{T}$, such that:

$$n(k) = T^{-1}(k,1) y(1) + T^{-1}(k,2) y(2) + T^{-1}(k,3) y(3) + \quad \text{(Eq C30)}$$
$$\ldots +$$
$$T^{-1}(k,k-1) y(k-1) + T^{-1}(k,k) y(k) +$$
$$T^{-1}(k,k+1) y(k+1) + \ldots + T^{-1}(k,D) y(D).$$

Equation (C30) can be rewritten in summation form as:

$$n(k) = \sum_{x=1}^{D} T^{-1}(k,x) \cdot y(x), \quad \text{(Eq C30a)}$$

where x is the summation parameter which runs from 1 to D.

However, since k may typically vary from 1 to say 10,000, the process of inverting the (10,000×10,000) element matrix $\underline{T}$ is computationally impractical. In practice, it is desirable to select a sliding window of finite length to meet computational requirements. Equation (C29) is then solved repeatedly within the sliding window. If the neighboring windows are shifted from each other by a single depth sample, then the estimated noise n(k) averaged over all the overlapping windows is given by a linear filter with depth-independent coefficients:

$$n(k) = 1/w \sum_{k_1=1}^{w} \sum_{k_2=1}^{w} \{T^{-1}(k_1,k_2) \cdot y(k + k_1 - k_2)\}, \quad \text{(Eq C31)}$$

where
k = parameter identifying the frame of measured data,
n(k) = estimated noise associated with the $k^{th}$ frame of data,
w = the width of the filter window,
$k_1, k_2$ = the summation variables,
$T^{-1}(k_1,k_2)$ the $(k_1,k_2)$ element of the matrix $\underline{T}^{-1}$,
$\underline{T}^{-1}$ = the inverse of the banded symmetric Toeplitz matrix $\underline{T}$,
$\underline{T}$ = the (w×w) matrix which represents in matrix form the coefficients of the estimated noise terms in the set of linear equations which relate estimated noise to the measure signals, and
$y(k+k_1-k_2)$ = function of the measured data given in Equation (C25).

To demonstrate the implementation of these mathematical steps, the next section presents the derivation of the minimal discontinuity filter for a selected electrode array according to FIG. 6, used in a particular fashion, and subject to specified hypothetical signal and noise levels as illustrated in FIG. 7.

Derivation of a Particular Minimal Discontinuity Filter

One particular example of an electrode array that can be used in the logging of bore holes is shown in FIG. 6. It contains 27 electrodes arranged in four horizontal rows, designated as Rows 1, 2, 3, and 4, from the top downward. The centers of the electrodes are spaced vertically from each other by a distance a=0.4 inches and horizontally by about 0.1 inch. The 27 electrodes, which are circular and about 0.2 inches (5 millimeters) in diameter, are identified by the azimuth position j, where the first electrode, the (j=1)-electrode, is the right-most electrode in the second row (as viewed in FIG. 6). The (j=2)-electrode, which lies in the third row, is displaced in azimuth direction from the (j=1)-electrode by 0.1 inches. This pattern continues for all 27 electrodes, such that Row 1 contains 6 electrodes (j=4,8,12,16,20,24), Row 2 contains 7 electrodes (j=1,5,9,13,17,21,25), Row 3 contains 7 electrodes (j=2,6,10,14,18,22,26), and Row 4 contains 7 electrodes (j=3,7,11,15,19,23,27).

Data is collected by measuring the signal from all of the 27 electrodes at a given time. Thus, a given data frame (identified by the letter k) of measurements from all 27 electrodes contains data for four different depths (identified by the parameter i) within the hole. The signals measured with the 6 electrodes of Row 1 will correspond to a particular depth in the hole of, for example, 8.4 inches. The 7 signals from Row 2 will correspond to a depth in the hole 0.4 inches (=a) below those recorded by the Row 1 electrodes. Similarly, the Row 3 electrodes will be measuring data for a depth 0.4 inches below those of Row 2; and Row 4, 0.4 inches below those.

If the signals are recorded at particular depth intervals d as the probe is pulled up the hole, then the data can be collected so as to maximize the characterization of each depth selected. Using the array depicted in FIG. 6, this can be achieved, for example, by recording data every time the probe moves 0.4 inches up the hole. For convenience in the present calculation, it is assumed that the depth interval d between successive samplings equals the inter-row distance a.

For example, assume that Row 1 of the array is at hole depth 8.4 inches when the $k^{th}$ data frame is collected. This depth can be identified by the hole depth parameter i. As explained above, Row 2 will be at depth i+1 which is 8.4″+a=8.4″+0.4″=8.8″, Row 3 at i+2 which is 8.4″+2a=8.4″+0.8″=9.2″, and Row 4 at i+3 which is 8.4″+3a=8.4″+1.2″=9.6″. When the next data frame (k+1) is collected, after the probe moves d=0.4 inches up the hole, then the Row 1 data will corresponds to depth i−1, which is 8.4"−a=8.4"−0.4"=8.0"; Row 2 data will correspond to i, which is 8.4"; Row 3 data will correspond to i+1, which is 8.8"; and Row 4 data will correspond to i+2, which is 9.2". One can see that as the probe is pulled up the hole, the selection of 0.4 inches as the sampling depth interval d results in eventual measurements at each selected depth by all 27 electrodes, albeit at 4 different times, thereby maximizing the azimuthal characterization at each selected depth.

Best characterization in the logging direction is achieved when the distance between electrode rows a is an integer multiple of the sampling depth interval d. Thus, for the array in FIG. 6, where the distance between electrode rows is a =0.4 inches, best depth characterization will be achieved using sampling depth intervals d of 0.4 inches, or 0.2 inches, or 0.1333 inches, or 0.1 inches, or 0.08 inches, and so on. Given a known rate of upward pulling of the probe, the time interval between successive data frames can be selected to choose the desired sampling depth interval d. However, as pointed out above, by extrapolating from the raw data and resampling at the desired depth intervals, the signal processor enables selection of a desired depth interval regardless of pulling rate.

The one-dimensional noise which the minimal discontinuity filter of this invention addresses is such that all 27 electrodes are affected at the same time by the same amount. This means that the noise at electrode j=1 is the same as the noise at electrode j=2 and electrode j=3, and so on to electrode j=27 for the frame of data collected at that same time. If data frame k is collected when Row 1 is at hole depth i=8.4 inches, then electrodes j=4,8,12,16,20,24 will be at hole depth i, electrodes j=1,5,9,13,17,21,25 will be at hole depth i+1, electrodes j=2,6,10,14,18,22,26 at hole depth i+2, and electrodes j=3,7,11,15,19,23,27 at hole depth i+3. Any noise N(i+1,1) (that is, noise at electrode j=1 at depth i+1) will be identical to the noise N(i+2,2) (that is, noise at electrode j=2 which is at depth i+2) when Row 1 is at depth i, and so on for the rest of the electrodes. This can be expressed mathematically as:

(Eq A6)
$N(i + 1, 1) = N(i + 2, 2) = N(i + 3, 3) = N(i, 4) =$
$N(i + 1, 5) = N(i + 2, 6) = N(i + 3, 7) = N(i, 8) =$
$N(i + 1, 9) = N(i + 2, 10) = N(i + 3, 11) = N(i, 12) =$
$N(i + 1, 21) = N(i + 1, 25) = N(i + 1, 17) = N(i + 2, 18) = N(i + 3, 19) = N(i, 20) =$
$N(i, + 1, 21) = N(i, + 2, 22) = N(i, + 3, 23) \ N(i, 24) =$
$N(i + 1, 25) = N(i + 2, 26) = N(i + 3, 27)$

The fact that all 27 noise signals are the same for this one-dimensional noise can be taken advantage of by referring to one noise value n(k), where k identifies the data frame which was subjected to that noise level. The assumption for this example of the minimal discontinuity filter is that data will be sampled at intervals of d=0.4 inches, so that the probe moves by one electrode row interval (a) between successive frames of measured data. This means that the geometry of the electrodes within the array depicted in FIG. 6 can be used to express the data frame parameter k in terms of the hole depth parameter i and the electrode parameter j, such that:

$k=i-g(j)=i-R[j]$.   (Eq A7)

where g(j)=the function which defines the vertical location of the array electrodes relative to the top-most electrode as a function of the parameter j, and $R[j]=\mod (j,4)=$ the remainder of $j$ divided by 4.   (Eq A8)

So, $R[j] = \begin{cases} 0, \text{ for } j = 4,8,12,16,20,24 & \text{(electrodes of Row 1)} \\ 1, \text{ for } j = 1,5,9,13,17,21,25 & \text{(electrodes of Row 2)} \\ 2, \text{ for } j = 2,6,10,14,18,22,26 & \text{(electrodes of Row 3)} \\ 3, \text{ for } j = 3,7,11,15,19,23,27 & \text{(electrodes of Row 4)} \end{cases}$ Now that it is established that, for the particular array and depth sampling interval of this example, the function g(j) is equal to R[j] and the number of array sensors is 27, Equations (C24) and (C25) can be rewritten for this example, such that:

$$\sum_{j=1}^{26} \{2n(k) - n(k + R[j] - R[j + 1]) - n(k + R[j + 1] - R[j])\} = y(k), \quad \text{(Eq A24)}$$

where $$y(k) = \sum_{j=1}^{26} \{M(k + R[j],j) - M(k + R[j],j + 1) - M(k + R[j + 1],j) + M(k + R[j + 1],j + 1)\} \quad \text{(Eq A25)}$$

Expanding Equation (A24) yields:

$y(k) = 2n(k) - n(k + R[1] - R[1 + 1]) -$   (Eq A26)
$n(k + R[1 + 1] - R[1]) + 2n(k) - n(k + R[2] - R[2 + 1]) -$
$n(k + R[2 + 1] - R[2]) + 2n(k) - n(k + R[3] - R[3 + 1]) -$
$n(k + R[3 + 1] - R[3]) + 2n(k) - n(k + R[4] - R[4 + 1]) -$
$n(k + R[4 + 1] - R[4]) + 2n(k) - n(k + R[5] - R[5 + 1]) -$
$n(k + R[5 + 1] - R[5]) + 2n(k) - n(k + R[6] - R[6 + 1]) -$
$n(k + R[6 + 1] - R[6]) + 2n(k) - n(k + R[7] - R[7 + 1]) -$
$n(k + R[7 + 1] - R[7]) + 2n(k) - n(k + R[8] - R[8 + 1]) -$
$n(k + R[8 + 1] - R[8]) + 2n(k) - n(k + R[9] - R[9 + 1]) -$
$n(k + R[9 + 1] - R[9]) + 2n(k) - n(k + R[10] - R[10 + 1]) -$
$n(k + R[10 + 1] - R[10]) +$
$2n(k) - n(k + R[11] - R[11 + 1]) -$
$n(k + R[11 + 1] - R[11]) +$
$2n(k) - n(k + R[12] - R[12 + 1]) -$
$n(k + R[12 + 1] - R[12]) +$
$2n(k) - n(k + R[13] - R[13 + 1]) -$
$n(k + R[13 + 1] - R[13]) +$
$2n(k) - n(k + R[14] - R[14 + 1]) -$
$n(k + R[14 + 1] - R[14]) +$
$2n(k) - n(k + R[15] - R[15 + 1]) -$
$n(k + R[15 + 1] - R[15]) +$
$2n(k) - n(k + R[16] - R[16 + 1]) -$
$n(k + R[16 + 1] - R[16]) +$
$2n(k) - n(k + R[17] - R[17 + 1]) -$
$n(k + R[17 + 1] - R[17]) +$
$2n(k) - n(k + R[18] - R[18 + 1]) -$
$n(k + R[18 + 1] - R[18]) +$
$2n(k) - n(k + R[19] - R[19 + 1]) -$
$n(k + R[19 + 1] - R[19]) +$
$2n(k) - n(k + R[20] - R[20 + 1]) -$
$n(k + R[20 + 1] - R[20]) +$
$2n(k) - n(k + R[21] - R[21 + 1]) -$
$n(k + R[21 + 1] - R[21]) +$
$2n(k) - n(k + R[22] - R[22 + 1]) -$
$n(k + R[22 + 1] - R[22]) +$
$2n(k) - n(k + R[23] - R[23 + 1]) -$
$n(k + R[23 + 1] - R[23]) +$
$2n(k) - n(k + R[24] - R[24 + 1]) -$
$n(k + R[24 + 1] - R[24]) +$
$2n(k) - n(k + R[25] - R[25 + 1]) -$
$n(k + R[25 + 1] - R[25]) +$
$2n(k) - n(k + R[26] - R[26 + 1]) -$
$n(k + R[26 + 1] - R[26])$

Evaluating R[j] in Equation (A26) using the definition of R[j] found in Equation (A8) yields:

$$
\begin{aligned}
y(k) = \; & 2n(k) - n(k+1-2) - n(k+2-1) + \\
& 2n(k) - n(k+2-3) - n(k+3-2) + \\
& 2n(k) - n(k+3-0) - n(k+0-3) + \\
& 2n(k) - n(k+0-1) - n(k+1-0) + \\
& 2n(k) - n(k+1-2) - n(k+2-1) + \\
& 2n(k) - n(k+2-3) - n(k+3-2) + \\
& 2n(k) - n(k+3-0) - n(k+0-3) + \\
& 2n(k) - n(k+0-1) - n(k+1-0) + \\
& 2n(k) - n(k+1-2) - n(k+2-1) + \\
& 2n(k) - n(k+2-3) - n(k+3-2) + \\
& 2n(k) - n(k+3-0) - n(k+0-3) + \\
& 2n(k) - n(k+0-1) - n(k+1-0) + \\
& 2n(k) - n(k+1-2) - n(k+2-1) + \\
& 2n(k) - n(k+2-3) - n(k+3-2) + \\
& 2n(k) - n(k+3-0) - n(k+0-3) + \\
& 2n(k) - n(k+0-1) - n(k+1-0) + \\
& 2n(k) - n(k+1-2) - n(k+2-1) + \\
& 2n(k) - n(k+2-3) - n(k+3-2) + \\
& 2n(k) - n(k+3-0) - n(k+0-3) + \\
& 2n(k) - n(k+0-1) - n(k+1-0) + \\
& 2n(k) - n(k+1-2) - n(k+2-1) + \\
& 2n(k) - n(k+2-3) - n(k+3-2)
\end{aligned}
$$
(Eq A27)

By combining similar terms, Equation (A27) can be reduced to:

$$y(k) = 52n(k) - 20n(k-1) - 20n(k+1) - 6n(k+3) - 6n(k-3) \quad \text{(Eq A28)}$$

Equation (A28) expresses the relationship between the measured data (as represented by the value of y(k) defined by Equation (A25)) and the estimated noise (as represented by the right side of Equation (A28)) as a function of the data frame parameter k. Since this relationship is true for all the data collected, that is for all values of k, then the relationship of Equation (A28) can be rewritten in matrix form to cover all the data collected, as was done in Equation (C26):

$$y = T \cdot n, \quad \text{(Eq A29)}$$

where $y$ and $n$ are as expressed in Equations (C27) and (C28), respectively, and $$
T = \begin{pmatrix}
52 & -20 & 0 & -6 & 0 & 0 & 0 \\
-20 & 52 & -20 & 0 & -6 & 0 & 0 \\
0 & -20 & 52 & -20 & 0 & -6 & 0 \\
-6 & 0 & -20 & 52 & -20 & 0 & -6 & \cdots \\
0 & -6 & 0 & -20 & 52 & -20 & 0 \\
0 & 0 & -6 & 0 & -20 & 52 & -20 \\
0 & 0 & 0 & -6 & 0 & -20 & 52 \\
& & & \vdots & & &
\end{pmatrix}
$$
(Eq A31)

Equation (A29) can be inverted to solve for the estimated noise matrix $\underline{n}$:

$$n = T^{-1} \cdot y, \quad \text{(Eq A33)}$$

where $T^{-1}$ = the inverse of matrix $T$ of Equation A31.

For example, if the selected window size w is 4, then the Toeplitz matrix $T$ of Equation (A31) reduces to the (4×4) matrix:

$$
T = \begin{pmatrix}
52 & -20 & 0 & -6 \\
-20 & 52 & -20 & 0 \\
0 & -20 & 52 & -20 \\
-6 & 0 & -20 & 52
\end{pmatrix}
\quad \text{(Eq A36)}
$$

The inverse $T^{-1}$ of this matrix $T$ is:

$$
T^{-1} = 1/252992 \begin{vmatrix}
6188 & 3030 & 1690 & 1364 \\
3030 & 7371 & 3485 & 1690 \\
1690 & 3485 & 7371 & 3030 \\
1364 & 1690 & 3030 & 6188
\end{vmatrix}
\quad \text{(Eq A37)}
$$

Thus, for example, the $(k_1,k_2)=(2,3)$ term of the matrix $T^{-1}$:

$$T^{-1}(k_1,k_2) = T^{-1}(2,3) = 3485/252992. \quad \text{(Eq A38)}$$

For the filter window size w=4, Equation (C31) can be expressed as:

$$n(k) = \tfrac{1}{4} \sum_{k_1=1}^{4} \sum_{k_2=1}^{4} \{T^{-1}(k_1,k_2) \cdot y(k + k_1 - k_2)\}, \quad \text{(Eq A38a)}$$

where the matrix elements $T^{-1}(k_1,k_2)$ are given by Equation (A37) and the terms $y(k+k_1-k_2)$ are given by Equation (A25).

Minimal Discontinuity Filter for Alternative Sampling Rate

As mentioned earlier, the minimal discontinuity filter derived in the previous section was based on a sampling interval d of 0.4 inches. If, for example, the sampling interval d is 0.1 inches instead, so as to give better vertical image definition, then the general function g(j), which expresses the relationship between the data frame parameter k and the hole depth parameter i and the electrode parameter j, is:

$$k = i - g(j) = i - 4R[j], \quad \text{(Eq A39)}$$

where R[j] is defined by Equation (A8).

The filter derivation then follows a path similar to that for the 0.4-inch sampling depth interval, except that wherever the functions R[j] and R[j+1] appear in Equations (A7), (A24), (A25), and (A26), the functions 4R[j] and 4R[j+1] should be substituted, respectively. The result is the following equation relating the measured data in the form of y(k) to the estimated noise n(k), which is analogous to Equation (A28):

$$y(k) = 52n(k) - 20n(k-4) - 20n(k+4) - 6n(k+12) - 6n(k-12) \quad \text{(Eq A40)}$$

where $$y(k) = \sum_{j=1}^{26} \{M(k + 4R[j],j) - M(k + 4R[j],j+1) - M(k + 4R[j+1],j) + M(k + 4R[j+1],j+1)\} \quad \text{(Eq A41)}$$

This relationship can still be presented in the matrix form of Equation (A29):

$$y = T \cdot n, \quad \text{(Eq A42)}$$

where the Toeplitz matrix $\underline{T}$ still has the form expressed in Equation (A31), but now:

$$y = \begin{pmatrix} \cdot \\ \cdot \\ y(k-12) \\ y(k-8) \\ y(k-4) \\ y(k) \\ y(k+4) \\ y(k+8) \\ y(k+12) \\ \cdot \\ \cdot \end{pmatrix} \quad \text{(Eq A43)}$$

and $$n = \begin{pmatrix} \cdot \\ \cdot \\ n(k-12) \\ n(k-8) \\ n(k-4) \\ n(k) \\ n(k+4) \\ n(k+8) \\ n(k+12) \\ \cdot \\ \cdot \end{pmatrix} \quad \text{(Eq A44)}$$

The minimal discontinuity filter for this example has a form analogous to that expressed in Equation (C31):

$$n(k) = 1/w \sum_{k_1=1}^{w} \sum_{k_2=1}^{w} \{T^{-1}(k_1, k_2) \cdot y(k + 4k_1 - 4k_2)\} \quad \text{(Eq A45)}$$

Thus, for a given value of k (that is, for a given data frame), only measured data from every fourth data frame need be included in the computations for the estimated noise n(k) of that data frame k. This makes sense when it is remembered that for an array with a=0.4 inches between electrode rows and a sampling interval d of 0.1 inches (as in this example), the electrodes of Row 2, for instance, will reach the hole depth of the electrodes of Row 1 only after 4 data frames have been taken. In essence, the current example is one in which 4 linearly independent filters offset from each other by 0.1 inches are essentially operating in parallel.

Application of the Minimal Discontinuity Filter

The general equation for the minimal discontinuity filter of this invention used to approximate the one-dimensional noise n(k) is given by Equation (C31) as:

$$n(k) = 1/w \sum_{k_1=1}^{w} \sum_{k_2=1}^{w} \{T^{-1}(k_1, k_2) \cdot y(k + k_1 - k_2)\}, \quad \text{(Eq B1)}$$

where the function y(k) has the general form as given in Equation (C25):

$$y(k) = \sum_{j+1}^{E-1} \{M(k + g(j), j) - M(k + g(j), j + 1) - M(k + g(j+1), j) + M(k + g(j+1), j + 1)\} \quad \text{(Eq B2)}$$

where $M(k+g(j), j) = M(i, j) =$ the data measured by electrode j at depth i during data frame k.

One particular array that can be used in the logging of bore holes is the one described in the previous sections and shown in FIG. 6. The implementation of the minimal discontinuity filter invention can be demonstrated using the set of hypothetical data shown in FIG. 7 and assumed to be collected during a bore-hole pull using the array of FIG. 6, but wherein data is collected every 0.4 inches. As can be seen from this hypothetical data, when Row 1 of the array was at a depth of 8.4 inches, the one-dimensional noise occurred such that an additional 20 units were added to each of the 27 electrode signals. For example, the (j=18) electrode in Row 3 should have measured 6 units to correspond to the true characteristic of the hole at that depth, but because of the linear noise of 20 units, the recorded signal was 26 units.

This example will demonstrate the implementation of the minimal discontinuity filter of Equation (B1) by computing the noise contained in the signal measured by electrode j=18 at a depth of 9.2 inches. The parameter k in Equation (B1) is used to identify the frame of 27 electrode signals measured at the same time; the parameter i is used to identify the set of 27 electrode signals corresponding to the same depth in the hole. In the present example, the depth of 9.2 inches is identified by the parameter i=23.

For the array of FIG. 6 and a sampling interval of 0.4 inches, the relationship between k and i and j as expressed by the function g(j) is given in Equation (A7) by:

$$k = i - g(j) = i - R[j], \quad \text{(Eq B3)}$$

where R[j] is as defined in Equation (A8). Thus, for electrode j=18 at depth i=23, the data frame parameter k is found using Equation (B3):

$$k = i - R[j] = 23 - R[18] = 23 - 2 = 21,$$

the depth of the top row of the sawtooth artifact depicted in FIG. 7.

For the array depicted in FIG. 6 and a sampling depth interval of 0.4 inches, the Toeplitz matrix $\underline{T}$ is given by Equation (A31). For this particular calculation, a filter window size w of 4 is used. When the filter size is 4, the Toeplitz matrix of Equation (A31) reduces to the (4×4) matrix of Equation (A36). The inverse $\underline{T}^{-1}$ of this matrix $\underline{T}$ is given by Equation (A37).

The one-dimensional noise in electrode j=18 at depth i=23 is estimated by computing n(k)=n(21) using Equation (B1) (where the filter window size w for this example is set to 4):

$$n(k) = \tfrac{1}{4} \sum_{k_1=1}^{4} \sum_{k_2=1}^{4} \{T^{-1}(k_1, k_2) \, y(k + k_1 - k_2)\} \quad \text{(Eq B8)}$$

Equation (B8) can be expanded to yield:

$$n(k) = \tfrac{1}{4} \{T^{-1}(1,1) \, y(k) + T^{-1}(1,2) \, y(k-1) + \quad \text{(Eq B9)}$$

-continued
$$T^{-1}(1,3) \, y(k-2) + T^{-1}(1,4) \, y(k-3) + T^{-1}(2,1) \, y(k+1) +$$
$$T^{-1}(2,2) \, y(k) + T^{-1}(2,3) \, y(k-1) + T^{-1}(2,4) \, y(k-2) +$$
$$T^{-1}(3,1) \, y(k+2) + T^{-1}(3,2) \, y(k+1) + T^{-1}(3,3) \, y(k) +$$
$$T^{-1}(3,4) \, y(k-1) + T^{-1}(4,1) \, y(k+3) + T^{-1}(4,2) \, y(k+2) +$$
$$T^{-1}(4,3) \, y(k+1) + T^{-1}(4,4) \, y(k)\}$$

Substituting 21 for k yields:

$$n(k) = n(21) = \tfrac{1}{4} \{T^{-1}(1,1) \, y(21) + T^{-1}(1,2) \, y(20) + \quad \text{(Eq B10)}$$
$$T^{-1}(1,3) \, y(19) + T^{-1}(1,4) \, y(18) + T^{-1}(2,1) \, y(22) +$$
$$T^{-1}(2,2) \, y(21) + T^{-1}(2,3) \, y(20) + T^{-1}(2,4) \, y(19) +$$
$$T^{-1}(3,1) \, y(23) + T^{-1}(3,2) \, y(22) + T^{-1}(3,3) \, y(21) +$$
$$T^{-1}(3,4) \, y(20) + T^{-1}(4,1) \, y(24) + T^{-1}(4,2) \, y(23) +$$
$$T^{-1}(4,3) \, y(22) + T^{-1}(4,4) \, y(21)$$

For the array of FIG. 6, the function y(k) of the measured data in Equation (B1) is found by substituting R[j] for the function g(j), as expressed in Equation (B3), into Equation (B2), and by noting that E−1=26 for an array with 27 electrodes, to yield:

$$y(k) = \sum_{j=1}^{26} \{M(k + R[j],j) - M(k + R[j],j+1) + \quad \text{(Eq B11)}$$
$$M(k + R[j+1],j+1) - M(k + R[j+1],j)\}$$

Equation (B11) can be expanded to yield:

$$y(k) = M(k+1,1) - M(k+1,2) + M(k+2,2) - \quad \text{(Eq B12)}$$
$$M(k+2,1) + M(k+2,2) - M(k+2,3) + M(k+3,3) -$$
$$M(k+3,2) + M(k+3,3) - M(k+3,4) + M(k,4) - M(k,3) +$$
$$M(k,4) - M(k,5) + M(k+1,5) - M(k+1,4) M(k+1,5) -$$
$$M(k+1,6) + M(k+2,6) - M(k+2,5) + M(k+2,6) -$$
$$M(k+2,7) + M(k+3,7) - M(k+3,6) + M(k+3,7) -$$
$$M(k+3,8) + M(k,8) - M(k,7) + M(k,8) - M(k,9) +$$
$$M(k+1,9) - M(k+1,8) + M(k+1,9) - M(k+1,10) +$$
$$M(k+2,10) - M(k+2,9) + M(k+2,10) - M(k+2,11) +$$
$$M(k+3,11) - M(k+3,10) + M(k+3,11) - M(k+3,12) +$$
$$M(k,12) - M(k,11) + M(k,12) - M(k,13) + M(k+1,13) -$$
$$M(k+1,12) + M(k+1,13) - M(k+1,14) + M(k+2,14) -$$
$$M(k+2,13) + M(k+2,14) - M(k+2,15) + M(k+3,15) -$$
$$M(k+3,14) + M(k+3,15) - M(k+3,16) + M(k,16) -$$
$$M(k,15) + M(k,16) - M(k,17) + M(k+1,17) -$$
$$M(k+1,16) + M(k+1,17) - M(k+1,18) + M(k+2,18) -$$
$$M(k+2,17) + M(k+2,18) - M(k+2,19) + M(k+3,19) -$$
$$M(k+3,18) + M(k+3,19) - M(k+3,20) + M(k,20) -$$
$$M(k,19) + M(k,20) - M(k,21) + M(k+1,21) - M(k+1,20) +$$
$$M(k+1,21) - M(k+1,22) + M(k+2,22) - M(k+2,21) +$$
$$M(k+2,22) - M(k+2,23) + M(k+3,23) - M(k+3,22) +$$
$$M(k+3,23) - M(k+3,24) + M(k,24) - M(k,23) + M(k,24) -$$
$$M(k,25) + M(k+1,25) - M(k+1,24) + M(k+1,25) -$$
$$M(k+1,26) + M(k+2,26) - M(k+2,25) + M(k+2,26) -$$
$$M(k+2,27) + M(k+3,27) - M(k+3,26)$$

The expansion of Equation (B10) requires the computation of y(k) using the expansion of Equation (B12) seven times, for values of k=18, 19, 20, 21, 22, 23, and 24. For k=18, Equation (B12) becomes:

$$y(18) = M(19,1) - M(19,2) + M(20,2) - M(20,1) + \quad \text{(Eq B13)}$$
$$M(20,2) - M(20,3) + M(21,3) - M(21,2) + M(21,3) -$$
$$M(21,4) + M(18,4) - M(18,3) + M(18,4) - M(18,5) +$$
$$M(19,5) - M(19,4) + M(19,5) - M(19,6) + M(20,6) -$$
$$M(20,5) + M(20,6) - M(20,7) + M(21,7) - M(21,6) +$$

-continued
$$M(21,7) - M(21,8) + M(18,8) - M(18,7) + M(18,8) -$$
$$M(18,9) + M(19,9) - M(19,8) + M(19,9) - M(19,10) +$$
$$M(20,10) - M(20,9) + M(20,10) - M(20,11) + M(21,11) -$$
$$M(21,10) + M(21,11) - M(21,12) + M(18,12) - M(18,11) +$$
$$M(18,12) - M(18,13) + M(19,13) - M(19,12) + M(19,13) -$$
$$M(19,14) + M(20,14) - M(20,13) + M(20,14) - M(20,15) +$$
$$M(21,15) - M(21,14) + M(21,15) - M(21,16) + M(18,16) -$$
$$M(18,15) + M(18,16) - M(18,17) + M(19,17) - M(19,16) +$$
$$M(19,17) - M(19,18) + M(20,18) - M(20,17) + M(20,18) -$$
$$M(20,19) + M(21,19) - M(21,18) + M(21,19) - M(21,20) +$$
$$M(18,20) - M(18,19) + M(18,20) - M(18,21) + M(19,21) -$$
$$M(19,20) + M(19,21) - M(19,22) + M(20,22) - M(20,21) +$$
$$M(20,22) - M(20,23) + M(21,23) - M(21,22) + M(21,23) -$$
$$M(21,24) + M(18,24) - M(18,23) + M(18,24) - M(18,25) +$$
$$M(19,25) - M(19,24) + M(19,25) - M(19,26) + M(20,26) -$$
$$M(20,25) + M(20,26) - M(20,27) + M(21,27) - M(21,26)$$

The values in this expansion are found in FIG. 7. For example, the measured signal M(19,1) is the signal measured by electrode j=1 at depth i=19, or 2 units. The signal M(19,2) measured by electrode j=2 at depth i=19 is also 2 units. Note, for example, that the first two terms of the third row of the expansion have values M(21,3)=4 units and M(21,4)=24 units. Substituting the appropriate values from FIG. 7 into Equation (B13) yields:

$$y(18) = (2 - 2 + 3 - 3 + 3 - 3 + 4 - 4 + 4 - 24 + \quad \text{(Eq B14)}$$
$$1 - 1 + 1 - 1 + 2 - 2 + 2 - 2 + 3 - 3 + 3 - 3 + 4 - 4 +$$
$$4 - 24 + 1 - 1 + 1 - 1 + 2 - 2 + 2 - 2 + 3 - 3 + 3 -$$
$$3 + 4 - 4 + 4 - 24 + 1 - 1 + 1 - 1 + 2 - 2 + 2 - 2 +$$
$$3 - 3 + 3 - 3 + 4 - 4 + 4 - 24 + 1 - 1 + 1 - 1 + 2 -$$
$$2 + 2 - 2 + 3 - 3 + 3 - 3 + 4 - 4 + 4 - 24 + 1 - 1 +$$
$$1 - 1 + 2 - 2 + 2 - 2 + 3 - 3 + 3 - 3 + 4 - 4 + 4 -$$
$$24 + 1 - 1 + 1 - 1 + 2 - 2 + 2 - 2 + 3 - 3 + 3 - 3 +$$
$$4 - 4) \text{ units} = -120 \text{ units}.$$

Similar evaluations of the expansion of Equation (B12) can be made to solve for the other 6 y(k) values in Equation (B10) to yield:

$$y(19) = 0 \text{ units} \quad \text{(Eq B15)}$$
$$y(20) = -400 \text{ units}$$
$$y(21) = 1040 \text{ units}$$
$$y(22) = -400 \text{ units}$$
$$y(23) = 0 \text{ units}$$
$$y(24) = -120 \text{ units}$$

Substituting these values for y(k) together with the values for the sensors of the inverse matrix $T^{-1}$ of Equation (A37) into the expansion of Equation (B10) yields:

$$n(k) = n(21) = (1/4)(1/252992)$$
$$\{(6188)(1040) + (3030)(-400) + (1690)(0) + (1364)(-120) +$$
$$(3030)(-400) + (7371)(1040) + (3485)(-400) + (1690)(0) +$$
$$(1690)(0) + (3485)(-400) + (7371)(1040) + (3030)(-400) +$$
$$(1364)(-120) + (1690)(0) + (3030)(-400) + (6188)(1040)$$
$$= 20 \text{ units}.$$

This computation shows that the noise n(k) when k is 21 is estimated to be 20 units. The measured signal M(i,j) is the sum of the ideal, true signal S(i,j) (corresponding to the true value of the measured characteristic of the hole at depth i and electrode j) and the noise N(i,j) (corresponding to the noise at depth i and electrode j), or:

$$M(i,j) = S(i,j) + N(i,j) \quad \text{(Eq B16)}$$

The true signal S(i,j) is therefore expressed by:

$$S(i,j) = M(i,j) - N(i,j) = M(i,j) - n[i-g(j)] = M(i,j) - n(k) \quad \text{(Eq B17)}$$

The one-dimensional noise which this minimal discontinuity filter invention addresses is such that all 27 electrodes are affected at the same time by the same amount. An estimated noise value n(k) of 20 units for k=21 means that all electrodes with k value 21 should have 20 units subtracted from their measured signals M(i,j) in order to yield the true data signal values S(i,j). Equation (B3) can be used to identify the electrode signals which correspond to k=21. They are:

M(22,1), M(23,2), M(24,3), M(21,4), ..., M(18,23), ..., M(23,26), M(24,27)

The estimation of the true signal S(i,j) for electrode j=18 at depth i=23 using Equation (B17) is therefore:

$$S(23,18) = M(23,18) - N(23,18) = M(23,18) - n(21) = 26 - 20 = 6 \text{ units.}$$

In this example, using ideal hypothetical values, the minimal discontinuity filter of Equation (B1) produced a value exactly equal to the amount of assumed noise which in this case is 20 units, thereby yielding a value for the estimated true signal exactly equal to the true value of the measured characteristic of the hole.

The computations in this example were geared towards solving for the noise level in one particular electrode sampling. Under normal circumstances, the flow of mathematical processing is preferably slightly different. A more realistic example of the use of the array of FIG. 6 for bore-hole logging may involve as many as 10,000 frames of data and a filter window size of 11. The sequence of computations on the measured data would then be:

(1) Compute the inverse $T^{-1}$ of the (11×11) Toeplitz matrix $T$ having the form of the matrix in Equation (B2), (2) Compute the function y(k) of the measured data using Equation (B11) for data frames k=1 to 10,000, (3) Compute the estimated noise level n(k) using Equation (B1) for data frames k=1 to 10,000 and filter window size w=11, and (4) Calculate the estimated true electrode signals S(i,j) for electrode j and depth i using Equation (B17) for j=1 to 27 and i=1 to 10,000.

Figure 8:
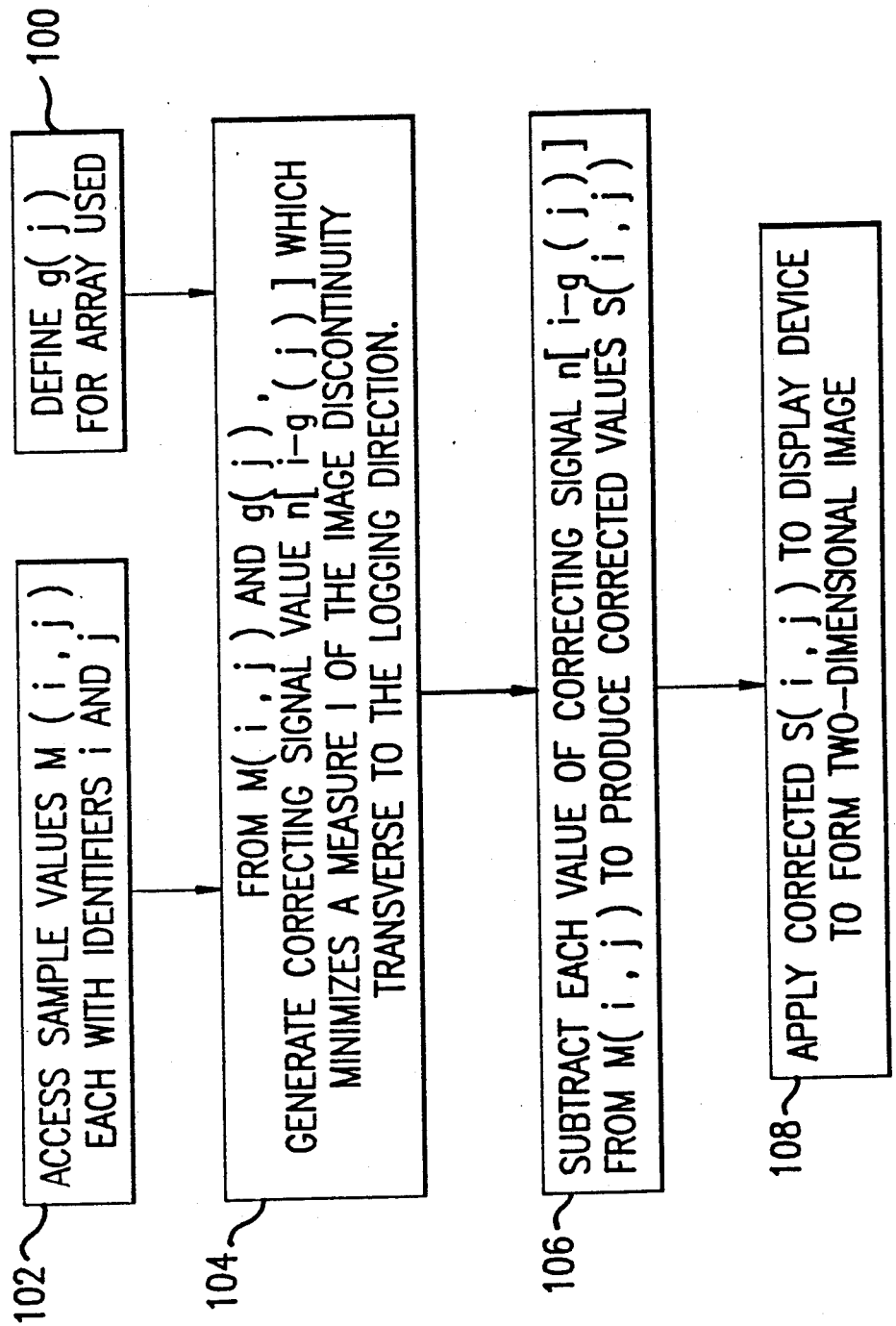
FIG. 8 is a flow diagram illustrating the basic steps of a preferred procedure for practicing of the invention in one of its forms.
Figure 9:
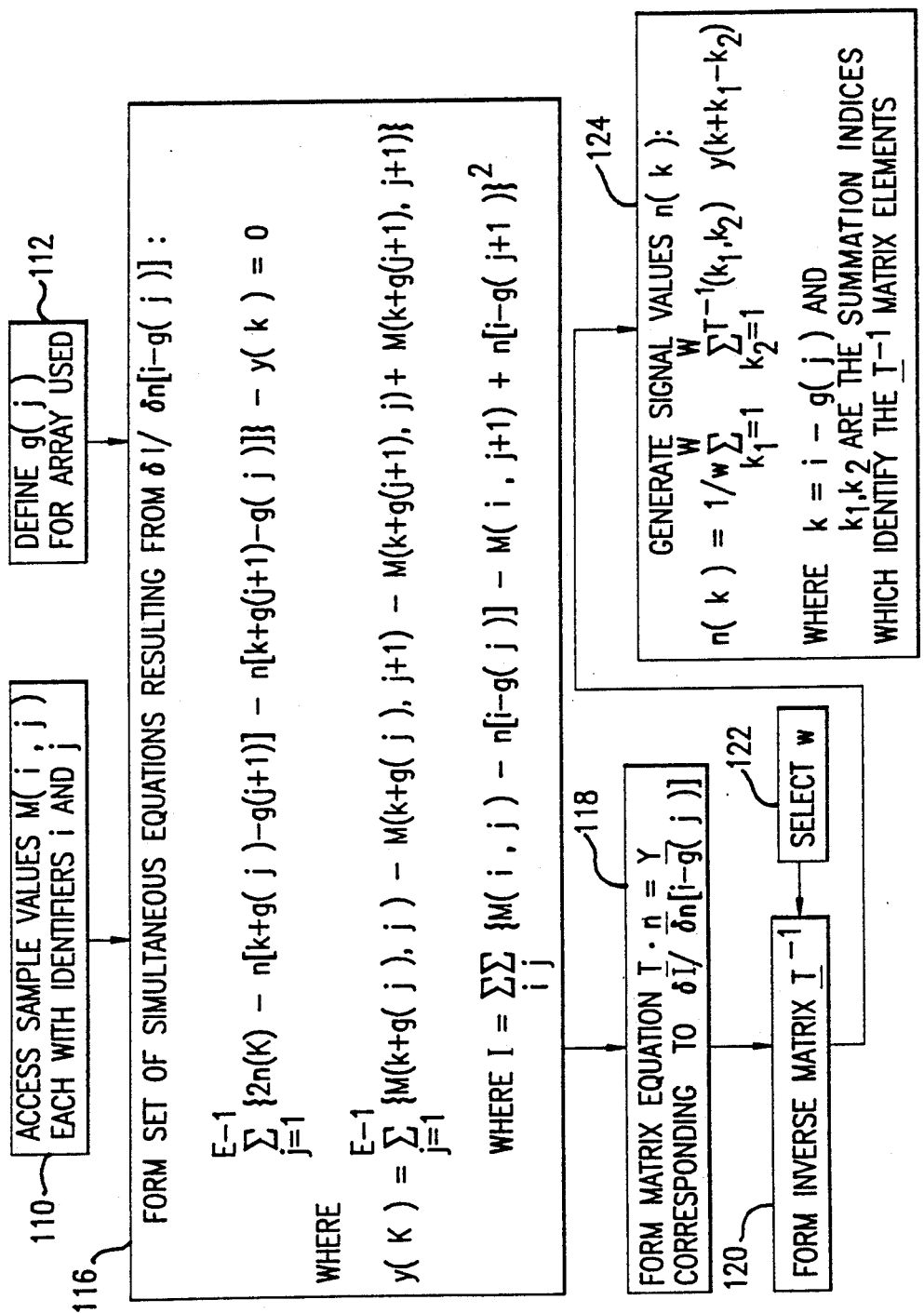
FIG. 9 is a flow diagram illustrating in somewhat more detail one manner of practicing the method of the invention in one of its forms.
Figure 10:
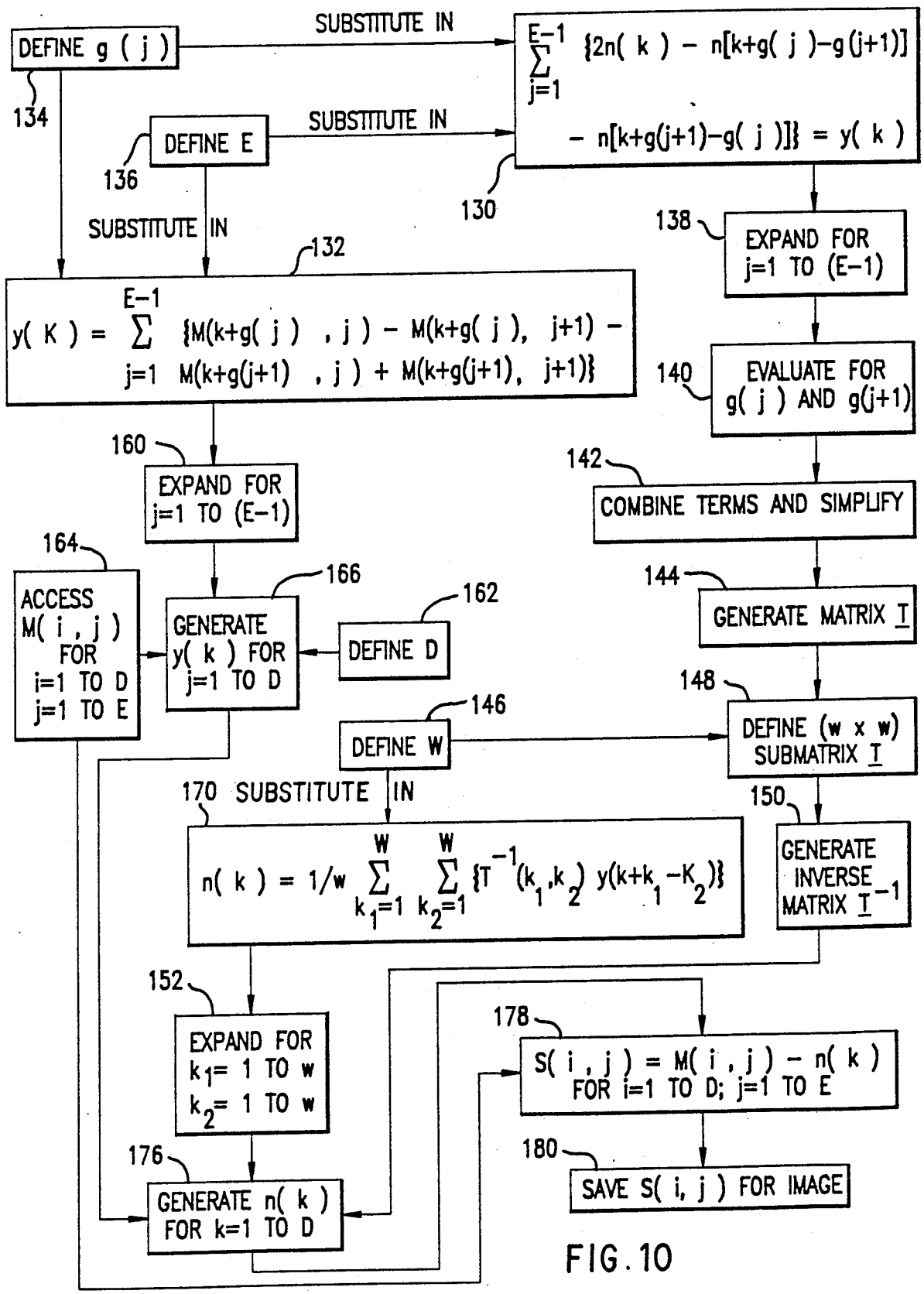
FIG. 10 is a flow diagram illustrating in even more detail a preferred way of practicing the method of the invention.

FIGS. 8, 9, and 10 show, respectively, a flow diagram for the broad steps of the method of the invention, a flow diagram for the steps involved in one preferred form of the method, and a more detailed flow diagram for a preferred method according to the invention, the implementation of which may be accomplished by appropriate corresponding programming of the minicomputer 54.

FIG. 8 shows at 100 that one first defines the g(j) of the selected array, as described above. At 102 the depth-adjusted sample values M(i,j) are accessed, together with their identifiers i and j. At 104 there is generated the correcting signal value of n[i−g(j)] which minimizes a measure I of the image discontinuity which is a function of differences transverse to the logging direction: S(i,j)−S(i,j+1), or M(j)−n[i−g(j)]−M(i,j+1)+n[i−g(j+1)]. At 106 each value of the correcting signal n[i−g(j)] is subtracted from M(i,j) to produce the corrected values S(i,j). At 108, the corrected signals S(i,j) are applied to the display device to form the two-dimensional image.

In the somewhat more detailed flow diagram of FIG. 9, at 110 and 112 the first two steps of FIG. 8 are repeated, and at 116 is shown the use of M(i,j) and g(j) to form the set of simultaneous equations resulting from taking the partial derivative of I with respect to n. At 118 is shown the formation of the matrix equation $T \cdot n = y$, corresponding to $\partial I/\partial n[i-g(j)]$. At 120 the inverse $T^{-1}$ of matrix $T$ is formed, for a window w, selected at 122. At 124 the correcting signal values n(k) are formed from $T^{-1}$ and y. The data is corrected and then used to produce the two-dimensional image as already shown at 106 and 108 of FIG. 8.

FIG. 10 shows the preferred process in detail. In this case, since the expression for n(k) shown partly at 130 and partly at 134, is known from the teachings of this invention, it need not be derived again in practical applications of the method; all that is necessary is to substitute into this expression the relevant values of g(j) and E to evaluate it for a particular case. This substitution is shown at 130 and 132, respectively. One first defines the form of g(j) at 134 for the particular array and sampling interval; for example, for the array of FIG. 6, g(j) this may be 0.4 R[j], using a sampling depth interval d equal to 0.1 inch and an inter-row distance of a=0.4 inch. The total number of electrodes E is defined at 136, which number in the foregoing example is 27.

These values of g(j) and E are substituted into the portion of the expression for n(k) which contain no measured signal values M(i,j), as shown at 130. They are also substituted into the expression y for the terms containing M(i,j), as shown at 132.

Considering first the steps flowing from 130, the expression in 130 is expanded for j=1 to j=(E−1) at 138. The result is evaluated for g(j) and g(j+1), at 140. At 142, terms are combined and simplified, and the results used to generate the matrix $T$, at 144. Next the window value w is selected at 146 and used to define the (w×w) curtailed matrix $T$. The latter matrix $T$ is used to generate its inverse $T^{-1}$ at 150, and $T^{-1}$ is then used in the generating of n(k) at 152. Once $T^{-1}$ has been computed for the array and the system to be used, it need not be computed again for that array and system.

Steps flowing from 132 involve substitution, into the formula shown, of the defined g(j) and the defined E; the y(k) so generated are then expanded for j=1 to (E−1), at 160. At 162, D is defined equal to the number of data frames to be examined (e.g. 10,000). At 164, M(i,j) are accessed, and at 166 the expanded y(k) use D and M(i,j) from 162 and 164, respectively, to generate y(k) for j=1 to D.

At 170, the selected value of w is substituted into the expression for n(k) and at 172 the result is expanded for $k_1$=(1 to w) and for $k_2$=(1 to w). At 176 the expanded value of n(k) is used to compute n(k) for k=(1 to D), using $T^{-1}$ from 150 and y(k) from 166.

The resultant n(k) from 176 and the M(i,j) signals from 164 are used at 178 to correct the M(i,j) values by subtracting n(k) from M(i,j) for i=1 to D and j=1 to E. As indicated at 180, the resultant corrected signals S(i,j) are used in forming the final two-dimensional image.

Figure 11:
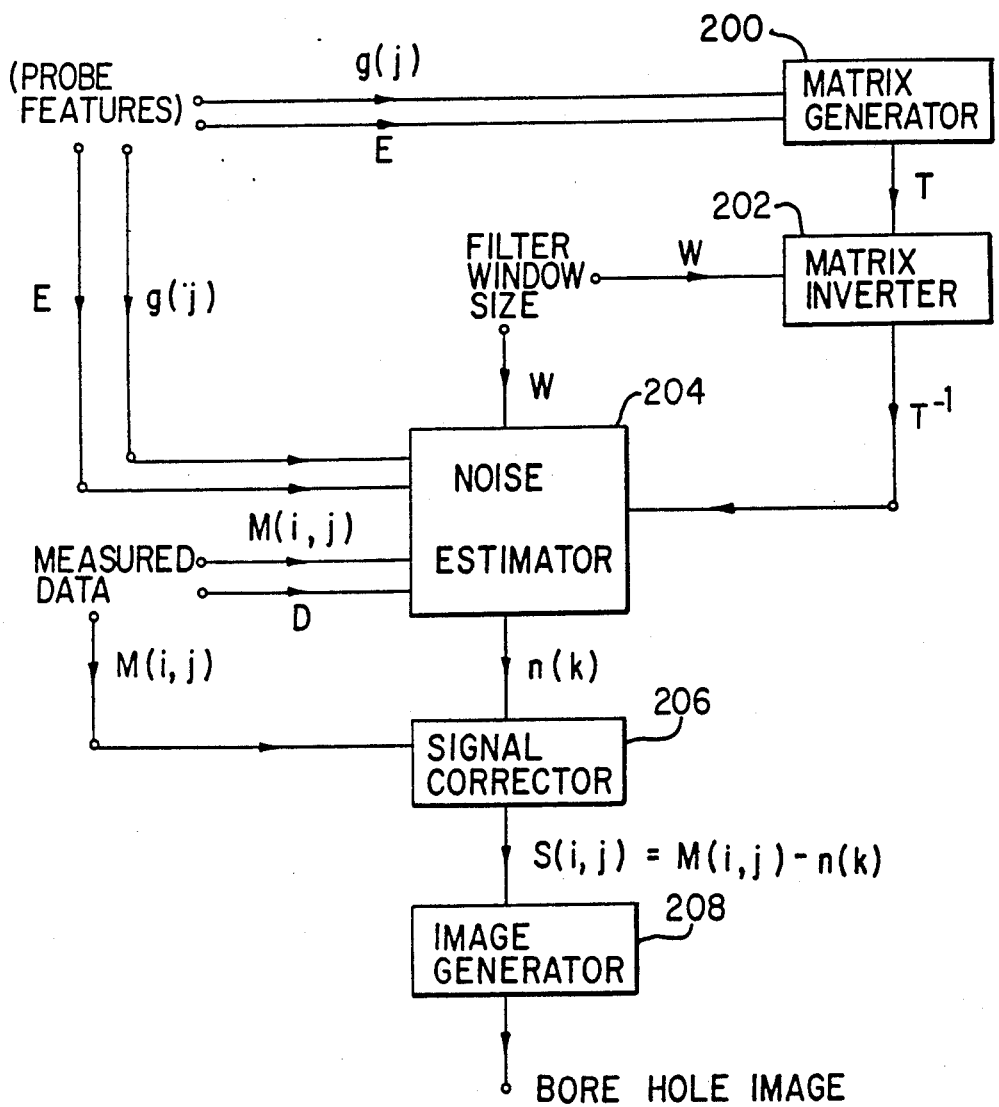
FIG. 11 is a block diagram illustrating in apparatus form a preferred embodiment of the invention.

FIG. 11 shows the minimal discontinuity filter in apparatus form. The information g(j) and E is supplied to a matrix generator 200 which generates the matrix $T$ described above. From $T$, the matrix inverter 202 produces $T^{-1}$ as defined previously, and supplies it to the noise estimator 204. The latter estimator is also supplied with the g(j) and E information, as well as the measured data M(i,j) and D, and from these produces the estimated noise signals n(k) as also previously described. The signal corrector 206 substracts n(k) appropriately from M(i,j) to produce the corrected S(i,j), which are used to generate, in the image generator 208, the signals which produce the actual two-dimensional bore-hole image on the image-display device.

Figure 12:
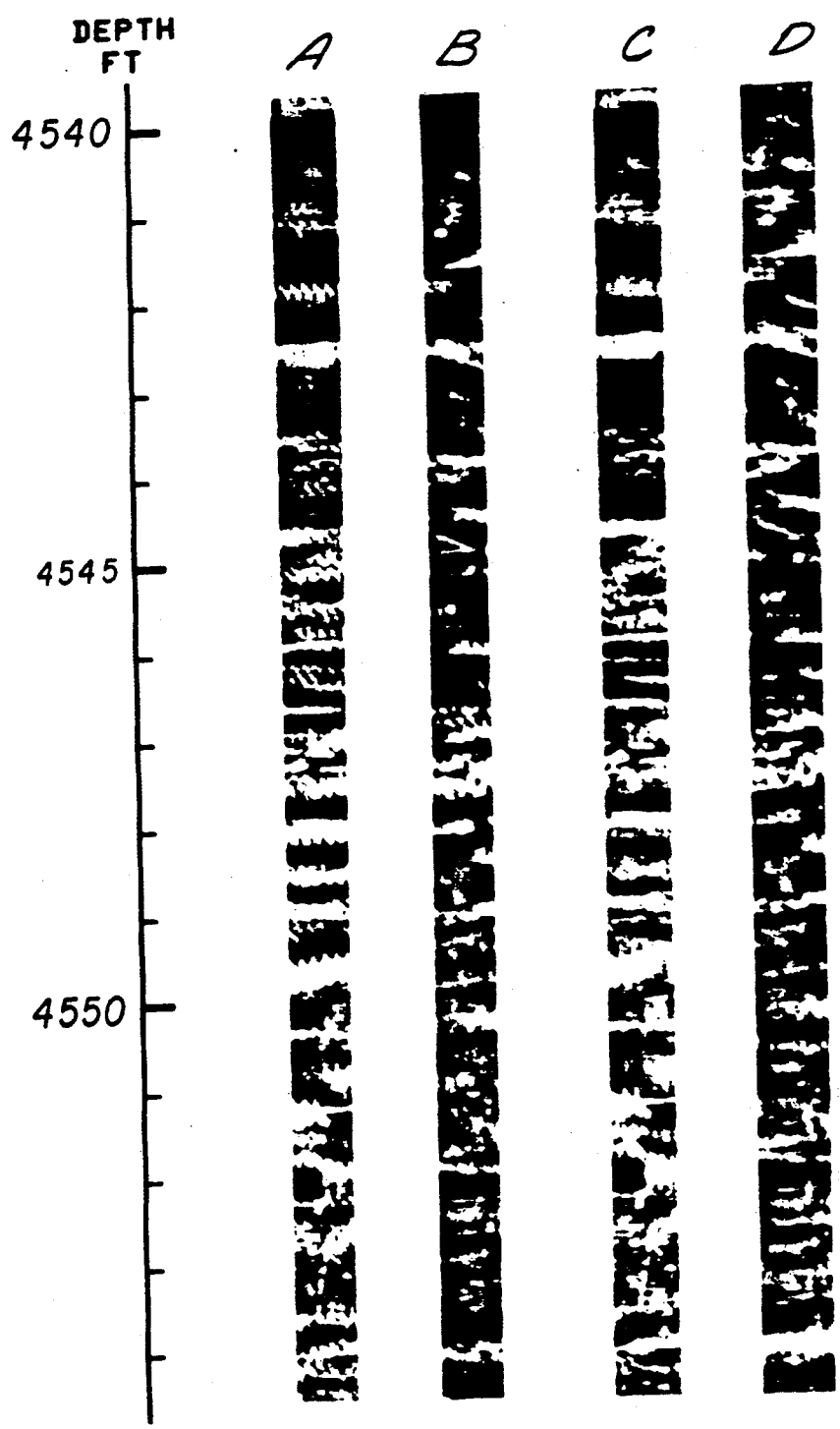
FIG. 12 shows pairs of logging images obtained using a water-based mud, one pair before and one pair after insertion of the filter of the invention into the logging system, respectively.

FIG. 12 shows at A and B two logs taken on the same logging run by two different pads of the formation microscanner referred to above, without filtering according to the invention. FIG. 12 shows at C and D respectively the logs obtained by applying the filtering system of the invention to the same data which produced logs A and B, and in which the sawtooth component is greatly reduced or eliminated.

In the idealized example discussed above with respect to FIG. 7, the true signal values in each horizontal row are assumed all to be equal, and the noise exists for exactly one frame time and is of exactly constant value. Under these conditions the correcting signal produced exact and complete cancellation of the assumed noise. To the extent that these ideal conditions are not present in a particular situation, noise cancellation will not necessarily be exact, and the measured values after noise cancellation of samples obtained when no noise is present may differ somewhat from their true values; nevertheless, for a substantial range of departures from ideal conditions, the correcting signal will provide useful reduction of the artifacts described above.

There are a variety of other respects in which the method and apparatus of the invention may differ substantially from that illustrated. For example, the noise may start and/or end in mid-frame; or there may be a plurality, or a large number, of immediately successive frames during which the noise occurs; or there may be a large number of both closely and widely time-spaced periods of noise, and in all such cases the noise may well differ in intensity during different frames. It is also assumed in the foregoing examples that the system is linear in the sense mentioned above, so that $M=N+S$, e.g., it is not so heavily overloaded by N and/or S that substantial non-linearity occurs.

With regard to the sensors, they need not be electrodes for an FMS TM or SP system, but can constitute any means for deriving values indicative of a characteristic of the adjacent portions of the earth formation, using for example acoustics, magnetics, particle emission, etc.

The pattern of the sensors in the array can also vary greatly in different embodiments of the invention. Any number of sensors greater than one may be used, and they may be in any pattern so long as at least some of them are spaced from each other along the direction of array motion and not aligned with each other along that direction. The array can be described by sets of sensors, where each set is identified by a position along the direction of array motion.

For example, one possible array uses a plurality of sensors arranged along a straight line not parallel to the direction of array motion, e.g., one ramp of the previously-described sawtooth. In such an array, the number of sets of sensors equals the total number of sensors in the array, each set containing just one sensor.

In another situation, the logging probe may contain sensors which are not all in unique locations along a second direction transverse to the direction of array motion; that is, there may be at least two sensors aligned along the direction of array motion. Under such conditions, the sets of sensors which comprise the array for purposes of this invention are those which are not aligned along the logging direction. Thus, for example, a probe which contains four sensors arranged in a square pattern with two of the sides of the square parallel to the logging direction will have two pairs of sensors which are aligned along that logging direction. In such a case, the array of sensors for the purpose of this invention may be defined by two sets of sensors, the first set containing only one of the sensors at the top of the square pattern and the second set containing only the sensor at the bottom of the square which is not aligned with the sensor of the first set, that is, the sensor at the other end of the diagonal bisector of the square pattern. This definition of the array of sensors includes two of the sensors of the probe and excludes the other two, for the purposes of this invention.

The parameters i, j, and k need not be used to identify the array position and the positions of the sensors according to the system described above, so long as k in some way identifies the array position along the logging direction and i and j identify the electrode positions according to a g(j) which permits expression of i in terms of j. Nor is it necessary to measure i and k in terms of increasing depths, as opposed to decreasing depths.

With regard to the pulling rates, sampling intervals, frame durations, and spacings of sensors along the pulling direction, the system is greatly simplified by performing the sampling so that the array does not move appreciably during the time it takes to complete one sampling, and by using the "frame grabber" illustrated, all sensors can in fact be sampled at exactly the same time; if instead the sensors themselves are sampled sequentially, each sampling frame is preferably of very short duration, i.e., the sensors are scanned at a very high rate. Further, while the pulling rate, the sampling time interval, and the distances between sensors along the pulling direction may be coordinated so that all sensors tend to be sampled for each depth at which any samples are taken, as pointed out above this is not essential, nor is it absolutely essential that the spacings between sensors along the pulling direction all be the same, since the signal processor can accommodate a wide range of variations in these respects.

It is also noted that the filter is not limited to use with data from the logging of a bore-hole wall in the prospecting for oil; the wall can be of any shape, size, and origin, and explored in searching for different minerals or for scientific geologic purposes, as examples. Also, the logging motion need not be exactly vertical, although the rows of sensors are preferably at right angles to whatever the direction of motion is.

With regard to the filter of the invention, it will be understood that it will usually not be used in real time in the logging process; the logging data are typically obtained at one time, and may be examined and processed at leisure, at a later time. At such time, the raw data, the depth-adjusted data, and the data passed through the filter of the invention may all be separately stored, and retrieved when desired for analysis and such processing as is desired. In general, one skilled in the art will be able to recognize the presence of one-dimensional noise in the uncorrected image which will benefit from use of the minimal discontinuity filter, and will use the filter to reduce the noise-induced artifacts. In some cases, as where the noise persists for at least several frames, repeated application of the filter of the invention may be made, by recirculating the corrected samples so they are filtered one or more additional times. The window size, and the number of frames filtered, can also be varied by the user to obtain best and/or simplest filtering.

While preferable in most cases, a window need not be used, and instead direct evaluation of a complete selected set of data may be used, especially where a high-powered computer is available. Where a window is used, it is preferably used only over a range of samples not so near the top or bottom of the surveyed area that a complete sliding of the window cannot be performed.

Also, while the above-described specific mathematical expressions for the filter are preferably employed in producing the correcting signal n, variations in this procedure are possible so long as the filter minimizes discontinuities between samples corresponding to the same depth, and, in effect, senses the presence of one-dimensional noise in the depth-adjusted samples and reduces that noise by subtracting estimated values of noise from all samples, the subtracted value being the same for all samples produced in the same original frame of samples.

For example, in the estimate of $n(k)$ set forth above, the sum of the squares of differences $S(i,j) - S(i,j+1)$ was used as a measure I of the absolute value of differences in true signal values along the transverse direction. However, other measures I may be used including, without limitation, the sum of higher even powers of $S(i,j) - S(i,j+1)$.

Further, while the filter of the invention finds special utility in use with signal samples from a staggered array, it is also useful in reducing certain types of noise which produce spurious differences between samples corresponding to positions on the bore-hole wall which are aligned with each other along the pulling direction, rather than staggered.

Accordingly, while the invention has been described with particular reference to specific embodiments in the interest of complete definiteness, it may be embodied in a variety of forms diverse from those specifically shown and described without departing from the spirit and scope of the invention.

What is claimed is:

1. In a method for producing a two-dimensional image of a characteristic of an area of a wall of an earth formation:

moving along said wall in a first direction a two-dimensional array of sensors responsive to said characteristic to produce a signal level at each sensor representative of the value of said characteristic in the portion of said wall adjacent thereto, wherein said array comprises a plurality of sets of one or more sensors, some of said sets being at different positions in said array as measured along said first direction, and at least one of the sensors of at least one of said sets being differently positioned from all of the sensors in at least one of the other of said sets, as measured along a second direction transverse to said first direction;

sampling said signal levels at all of said sensors of said sets at each of a succession of sampling times, to produce successive original frames of sensor signal samples;

processing said samples and applying said samples to a two-dimensional display device in sets such that said processed samples of each of said original frames control points in said display which are in a geometric pattern corresponding to the geometric pattern of said sets of sensors in said array, whereby noise affecting each of said sensors substantially equally during any of said sampling times produces an artifact in said image having a form corresponding to said pattern of said array of sensors; and prior to said applying of said processed samples to said image-display device, generating from said samples a correcting signal n, and subtracting it from each of said samples, to reduce any such artifact in said image, wherein the values of n are generated such as to minimize abrupt discontinuites between values of those samples which are produced in different original frames by sensors at the same position along said first direction, and wherein the values of n so subtracted are equal for all samples produced at the same sampling time.

2. The method of claim 1, wherein said correcting signal n has values which minimize an image discontinuity measure I, where I is a function of differences in signal samples evaluated over a plurality of said frames of samples.

3. The method of claim 2, wherein said sensors of said sets which are located at different positions along said first direction are spaced apart along said first direction by distances which are integral multiples, including one, of the distance which said array moves between successive sampling intervals.

4. The method of claim 2, wherein I is a function of $S(i,j) - S(i,j+1)$, where $S(i,j) = M(i,j) - N(i,j)$, where:

i is an integer index representing the position of each of said sensors, with respect to a reference position, when its signal level is sampled, measured along said first direction and in terms of units equal to the distance which said array moves between successive samplings;

j is an integer index representing the position of each of said sensors along a second direction transverse to said first direction, and measured in terms of the ordinal number of each sensor position, numbered along said second direction;

$M(i,j)$ is the measured value of each of said sensor signal samples taken at sensor positions $(i,j)$;

$N(i,j)$ is the value of said noise in the signal sample at each corresponding sensor position $(i,j)$ and is substantially the same for all of said sensors at any given sampling time; and $S(i,j)$ is the true value of the sensor signal sample produced by each of said sensors at position $(i,j)$, in the absence of said noise $N(i,j)$.

5. The method of claim 4, wherein said image discontinuity function I is a function of the absolute values of said differences $S(i,j) - S(i,j+1)$, evaluated over a plurality of said frames of samples.

6. The method of claim 4, wherein said image discontinuity function I is a function of the sum of the squares of said differences $S(i,j) - S(i,j+1)$, evaluated over a plurality of said frames of samples.

7. The method of claim 6, wherein said correcting signal has values satisfying the set of simultaneous linear equations derivable from $\partial I/\partial n = 0$.

8. The method of claim 7, wherein said correcting signal has values equal to those resulting from an evaluation of:

$$n(k) = \sum_{x=1}^{D} T^{-1}(k,x) \cdot y(x),$$

wherein:
- n(k) is the estimated value of said noise in each of said sensor signal samples measured during the same said frame k of sampling,
- x is an integer summation parameter which takes on values from 1 to D,
- D is the number of frames comprising substantially the entire image,
- $T^{-1}(k,x)$ represents the (k,x) element of the matrix $T^{-1}$,
- $\underline{T^{-1}}$ represents the inverse of a banded symmetric Toeplitz matrix $\underline{T}$,
- $\underline{T}$ represents in matrix form the coefficients of the noise-containing terms in the set of linear simultaneous equations obtainable by setting $\partial I/\partial n = 0$, $$y(x) = \sum_{j=1}^{E-1} \{M(x + g(j),j) - M(x + g(j),j + 1) -$$

$$M(x + g(j + 1),j) + M(x + g(j + 1),j + 1)\}$$

- E represents the number of said sensors in said sensor array, and
- g(j) represents in units of i the position of each of said sensors along said first direction with respect to a reference position fixed with respect to said array, expressed as a function of the position of each sensor along said second direction.

9. The method of claim 7, wherein said correcting signal has values equal to those resulting from an evaluation of:

$$n(k) = 1/w \sum_{k_1=1}^{w} \sum_{k_2=1}^{w} T^{-1}(k_1, k_2) \cdot y(k + k_1 - k_2),$$

wherein:
- n(k) is the estimated value of said noise in each of said sensor signal samples measured during the same said frame k of sampling,
- w represents the size of the filter window which is equivalent to the dimension along said first direction of the size of said portion of said image, where w is some number less than the number of frames which comprise the entirety of the image,
- $k_1$ and $k_2$ represent the integer summation parameters which takes on values from 1 to w,
- $T^{-1}(k_1,k_2)$ represents the $(k_1,k_2)$ element of the matrix $\underline{T^{-1}}$,
- $\underline{T^{-1}}$ represents the inverse of a banded symmetric Toeplitz matrix $\underline{T}$,
- $\underline{T}$ represents in matrix form the coefficients of the noise-containing terms in the set of linear simultaneous equations obtainable by setting $\partial I/\partial n = 0$,
- y(k) represents the function of said measured data, whereby:

$$y(x) = \sum_{j=1}^{E-1} \{M(k + g(j),j) - M(k + g(j),j + 1) -$$

$$M(k + g(j + 1),j) + M(k + g(j + 1),j + 1)\}$$

- E represents the number of said sensors in said sensor array, and
- g(j) represents in units of i the position of each of said sensors along said first direction with respect to a reference position fixed with respect to said array, expressed as a function of the position of each sensor along said second direction.

10. The method of claim 9, wherein said integral number is 4 and said function g(j) is i−4R[j], where R[j] is the remainder resulting from division of j by 4.

11. The method of claim 1, wherein said signal samples are depth-adjusted before subtraction of said correcting signal n by selecting, from the frames of samples produced by sensors at different depth positions, corresponding sets of samples produced by said sensors when they are at the same depths.

12. A method for producing a two-dimensional display of characteristics of an area of a wall of a bore hole in an earth formation, comprising the steps of:
- moving along said wall in a first direction a two-dimensional array of sensors responsive to said wall characteristics;
- producing, at said sensors, sensor signal levels representative of the values of said characteristic in the respective portions of said wall adjacent said sensors;
- sampling sets of said sensor signal levels successively and repetitively to produce successive frames of sensor signal-level samples;
- the centers of at least some of said sensors being spaced along the direction of said moving and at unique positions along a second direction at right angles to said first direction;
- depth-adjusting said samples of said frames by selecting from said frames corresponding depth-adjusted sets in each of which sets the samples are from sensors sampled at the same position of said array along said first direction;
- in response to said depth-adjusted samples, producing said two-dimensional display on a two-dimensional display device by displaying, along each transverse line in said display, the set of signal samples produced at said sensors when they are positioned along the same corresponding transverse line at said wall; and
- modifying said frames of depth-adjusted signal samples prior to their application to said display device by generating and subtracting from said samples a correcting signal value n selected to minimize substantial differences between those of said signal samples corresponding to laterally-adjacent positions in said area of said wall, and to produce the same value of correcting signal for each frame of depth-adjusted samples produced at a given time.

13. A system for producing indications of characteristics of a segment of an earth formation adjacent to an exposed surface thereof, comprising:
- a two-dimensional array of electrodes;
- means for providing a logging motion of said array along said surface of said earth formation segment;
- means for deriving from said electrodes frames of measured signal values M indicative of characteristics of the respective portions of said earth formation adjacent to each of said electrodes;
- display means responsive to said measured values for producing a two-dimensional display representative of the values of said characteristics throughout said segment of said earth formation;
- said array including at least some electrodes at different depth positions in said array which are laterally staggered with respect to each other as opposed to being aligned along the direction of said logging motion;

depth adjustment means responsive to said measured sample values M from said electrodes for assuring that portions of said image corresponding to any given depth position are controlled by measured electrode signal values M from electrodes at a corresponding depth at the earth-formation surface;

said system tending to respond to spurious signal levels appearing simultaneously and in substantially the same magnitude on all of said electrodes, to produce in said image spurious artifacts;

said system comprising filter means for modifying said measured electrode signal values before they are supplied to said image display means from said depth adjustment means, to counteract the tendency for formation of said artifacts in said image;

said filter means comprising means for subtracting from each of said measured electrode signal values a correcting value n given by the expression:

$$n(k) = 1/w \sum_{k_1=1}^{w} \sum_{k_2=1}^{w} T^{-1}(k_1, k_2) \cdot y(k + k_1 - k_2),$$

wherein k is an integer index representing the frame of said sensor signal values measured at the same time;

n(k) is the value of said correcting value n to be subtracted from each signal sample measured during the sampling frame k;

w represents the dimension of the filter window which is equivalent to the dimension along said direction of said logging motion of the size of said portion of said image, where w is some number less than the number of frames which comprise the entirety of the image;

$k_1$ and $k_2$ represent the integer summation parameters, which take on values from 1 to w;

$T^{-1}(k_1,k_2)$ represents the $(k_1,k_2)$ element of the matrix $\underline{T}^{-1}$, where $\underline{T}^{-1}$ represents the inverse of the banded symmetric Toeplitz matrix $\underline{T}$, where $\underline{T}$ represents in matrix form the coefficients of the noise terms in the set of linear simultaneous equations which are obtained by setting equal to zero the partial derivative of the image discontinuity measure I with respect to said noise n(k), where:

$$I = \sum_i \sum_{j=1}^{E-1} \{S(i,j) - S(i,j+1)\}^2,$$

where

E is the number of said sensors in said sensor array, i is an integer index representing the ordinal number of sampling distance intervals relative to some reference position on said wall of said earth formation, measures along said direction of said logging motion, wherein said sampling distance interval is the distance along said direction that said array of said sensors moves between successive samplings of said sensor signals, and where said parameter i takes on values corresponding to a range of positions along said direction which span at least a portion of said image, j is an integer index representing the ordinal number of the position of each successive sensor, numbered along a direction perpendicular to said direction of said logging motion, where said parameter j takes on values in the double summation from 1 to (E−1), and S(i,j) is the true value of said sensor signal sample at said position i and said position j in the absence of said noise, where:

$$S(i,j) = M(i,j) - N(i,j),$$

where

M(i,j) is the actual measured value of said sensor signal sample at said position i and said position j, and N(i,j) is the value of said noise in said sensor signal sample at said position i and said position j, said noise N(i,j) being equal for all said sensor signal samples of the same said frame k measured at the same time, and where:

$$N(i,j) = n[i - g(j)] = n(k),$$

where g(j) represents in units of i the position of each of said sensors along said first direction with respect to some reference position relative to said array of said sensors, expressed as a function of said position j;

n[i−g(j)]=n(k) is the value of said noise correcting signal for each of said sensor signal samples measured during the same frame k, where i, j, and k satisfy the relation:

$$k = i - g(j);$$

and y(k) is given by the following function of said measured data:

$$y(x) = \sum_{j=1}^{E-1} \{M(k + g(j),j) - M(k + g(j),j + 1) - M(k + g(j + 1),j) + M(k + g(j + 1),j + 1)\}$$

14. A system for producing a two-dimensional display representing at each fixed position therein a signal value produced at a corresponding sensor of a staggered two-dimensional array of sensors of a predetermined wall characteristic, as said array is subjected to motion along the wall of an earth-formation, said system comprising:

sampling means for producing successive frames k each containing a frame of samples of the contemporaneous values of each of said signals at each of said staggered sensors, each of said sensors being located at a different identifiable azimuth position j measured along a direction perpendicular to the direction of said motion;

resampling means for resampling said sample data to select from different ones of said frames new sets of samples M(i,j) each corresponding to a common azimuthal line in said earth-formation wall;

and two-dimensional display means supplied with said resampled sets of samples for producing a visual display of each of said sets of resampled signals along a corresponding straight line in said display;

filter means for reducing spurious artifacts produced in said image by noise N appearing at said sensor and which varies as a function of time but is subtantially the same at each of said sensors at any given time, said filter means being responsive to said resampled samples M(i,j) for deriving therefrom an estimated value n for said noise N(i,j) for each of the samples M(i,j) and comprising means for subtracting each of said values of n from each said samples M(i,j) to produce signal samples S(i,j) of substantially the correct true values for application to said image-display device; said filter means comprising means for deriving said signals n representative of N from the measured, resampled signal M(i,j) by evaluating the quantity:

$$n(k) = 1/w \sum_{k_1=1}^{w} \sum_{k_2=1}^{w} T^{-1}(k_1, k_2) \cdot y(k + k_1 - k_2),$$

wherein k is an integer index representing the frame of said sensor signal values measured at the same time;

n(k) is the value of said correcting value N in each of said sensor signal samples measured during the same said frame k of sampling;

w represents the dimension of the filter window which is equivalent to the dimension along said direction of said motion, and where w is some number less than the number of frames which comprise the entirety of the image;

$k_1$ and $k_2$ represent the integer summation parameters which take on values from 1 to w;

$T^{-1}(k_1,k_2)$ represents the $(k_1,k_2)$ element of the matrix $\underline{T}^{-1}$, where $\underline{T}^{-1}$ represents the inverse of the banded symmetric Toeplitz matrix $\underline{T}$, where $\underline{T}$ represents in matrix form the coefficients of the noise terms in the set of linear simultaneous equations which are obtained by setting equal to zero the partial derivative of the image discontinuity measure I with respect to said noise n(k), where:

$$I = \sum_{i} \sum_{j=1}^{E-1} \{S(i,j) - S(i,j+1)\}^2,$$

where

E is the number of said sensors in said sensor array, i is an integer index representing the ordinal number of sampling distance intervals relative to some reference position on said wall of said earth formation along said direction of said motion, wherein said sampling distance interval is the distance along said direction that said array of said sensors moves between successive samplings of said sensor signals, where said parameter i takes on values corresponding to the range of positions along said direction which span at least a portion of said image, j is an integer index representing the ordinal number of the position of each successive sensor, numbered along a direction perpendicular to said direction of said motion, where said parameter j takes on values in the double summation from 1 to (E−1), and S(i,j) is the true value of said sensor signal sample at said position i and said position j in the absence of said noise, and:

$$S(i,j) = M(i,j) - N(i,j),$$

where

M(i,j) is the actual measured value of said sensor signal sample at said position i and said position j, and N(i,j) is the value of said noise in said sensor signal sample at said position i and said position j, where said noise N(i,j) is equivalent for all said sensor signal samples of the same said frame k measured at the same time, where:

$$N(i,j) = n[i - g(j)] = n(k),$$

where g(j) represents in units of i the position of each of said sensors along said first direction with respect to some reference position relative to said array of said sensors, expressed as a function of said position j;

n[i−g(j)] is the value of said noise in each of said sensor signal samples measured during the same said frame k of sampling for which the position i was measured by sensor j, where i, j, and k satisfy:

$$k = i - g(j);$$

and y(k) represents the following function of said measured data:

$$y(x) = \sum_{j=1}^{E-1} \{M(k+g(j),j) - M(k+g(j),j+1) - M(k+g(j+1),j) + M(k+g(j+1),j+1)\}$$

15. A system for producing a two-dimensional image of at least a segment of a surface of an earth-formation wall, comprising:

(a) a two-dimensional array of sensor electrodes and means for moving said array along said wall segment in a first direction, the center of said electrodes being spaced from each other both along said first direction and along a second direction at right angles to said first direction, at least some of said electrodes at different positions along said first direction being non-aligned with each other along said first direction;

(b) sampling means for repetitively sampling the signal levels at all of said electrodes to form corresponding original frames of signal samples;

(c) depth-adjustment means for processing said original frames of signal samples to produce depth-adjusted frames of said signal samples, all of said samples in each of said depth-adjusted frames being produced at the same position along said wall;

(d) a two-dimensional display device responsive to said depth-adjusted frames of signal samples to producing successive lines in said image in response to corresponding different ones of said depth adjusted frames of signal samples, thereby to form a two-dimensional image of said wall segment which is subject to noise which affects all of said electrode signal levels substantially equally and thereby introduces corresponding artifacts into said image;

(e) filter means for filtering said depth-adjusted signal samples to reduce said artifacts;

(f) said filter means comprising noise-signal estimating means responsive to said depth-adjusted samples to generate correcting signals having discrete values n(k) identified with each of said depth-adjusted samples, and means for substracting each value n(k) of said correcting signals from the corresponding sample to reduce said artifacts in said image:

(g) wherein said correcting signal values are selected to minimize differences between the values of said depth-adjusted signal samples produced by electrodes adjacent to each other along said second direction, and to distribute said correcting signals equally over sets of depth-adjusted samples produced by the same original frames of said signal samples.

16. The system of claim 15, wherein said values N(k) are generated so as to minimize the differences $S(i,j) - S(i,j+1)$, where S represents the true values of said depth-adjusted signal samples in the absence of said noise, i is an index representing the depths at which said depth-adjusted signal samples were originally produced, and j is an index representing the ordinal number of the electrode which produced the sample numbered along said second direction, and wherein n is a function of a parameter $k = i - g(j)$, where g is a function of i which relates the positions j of said electrodes in said array, numbered along said second direction, to the relative positions of said electrodes measured along said first direction in terms of i.

* * * * *